United States Patent
Kouyama

(10) Patent No.: US 11,953,781 B2
(45) Date of Patent: Apr. 9, 2024

(54) DISPLAY APPARATUS THAT TIME-DIVISIONALLY ILLUMINATES DIFFERENT PIXEL REGIONS WITH DIFFRACTED COLOR LIGHT BEAMS

(71) Applicant: SONY SEMICONDUCTOR SOLUTIONS CORPORATION, Kanagawa (JP)

(72) Inventor: Yoshiaki Kouyama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/420,480

(22) PCT Filed: Dec. 11, 2019

(86) PCT No.: PCT/JP2019/048416
§ 371 (c)(1),
(2) Date: Jul. 2, 2021

(87) PCT Pub. No.: WO2020/153026
PCT Pub. Date: Jul. 30, 2020

(65) Prior Publication Data
US 2022/0082887 A1 Mar. 17, 2022

(30) Foreign Application Priority Data
Jan. 24, 2019 (JP) .................................. 2019-010059

(51) Int. Cl.
*G02F 1/13357* (2006.01)
*G02F 1/1335* (2006.01)
(Continued)

(52) U.S. Cl.
CPC .. *G02F 1/133606* (2013.01); *G02F 1/133622* (2021.01); *G09G 3/02* (2013.01);
(Continued)

(58) Field of Classification Search
None
See application file for complete search history.

(56) References Cited

U.S. PATENT DOCUMENTS 5,969,832 A * 10/1999 Nakanishi ............ H04N 9/3117
349/8
6,384,816 B1 * 5/2002 Tabata ................ G02F 1/13471
345/204
(Continued)

FOREIGN PATENT DOCUMENTS

| CN | 108803217 | 11/2018 |
|---|---|---|
| JP | H09-214997 | 8/1997 |

(Continued)

OTHER PUBLICATIONS

International Search Report prepared by the Japan Patent Office dated Feb. 21, 2020, for International Application No. PCT/JP2019/048416.

*Primary Examiner* — Kirk W Hermann
(74) *Attorney, Agent, or Firm* — Sheridan Ross PC

(57) ABSTRACT

An apparatus includes a light source unit that emits color light beams having different wavelengths; a light intensity modulation element including pixels, and subjecting the color light beams to intensity modulation to generate an image; a diffraction element configured to simultaneously illuminate at least two pixel regions at different pixel positions, with different color light beams, by diffracting the respective color light beams from the light source unit toward pixel regions at different pixel positions on the light intensity modulation element; and a control unit that changes diffraction angles of the respective color light beams in the diffraction element within a predetermined period. The control unit also sequentially switches illumination regions for the pixel regions by the respective color light beams, to allow all of the color light beams to time- (Continued)

divisionally illuminate any pixel region of the pixel regions within the predetermined period.

5 Claims, 18 Drawing Sheets

(51) Int. Cl.
  *G09G 3/02* (2006.01)
  *G09G 3/34* (2006.01)
  *G09G 3/36* (2006.01)

(52) U.S. Cl.
  CPC ............ *G09G 3/3413* (2013.01); *G09G 3/36* (2013.01); *G09G 2320/0242* (2013.01)

(56) References Cited

U.S. PATENT DOCUMENTS

| | | | | |
|---|---|---|---|---|
| 2003/0090597 A1* | 5/2003 | Katoh | .................. | H04N 9/3111 348/E9.027 |
| 2003/0147015 A1* | 8/2003 | Katoh | .................. | G02F 1/1347 349/5 |
| 2004/0207815 A1* | 10/2004 | Allen | ..................... | G09G 5/391 353/31 |
| 2005/0157272 A1* | 7/2005 | Childers | ................ | G09G 3/007 348/E9.027 |
| 2006/0082562 A1* | 4/2006 | Childers | .............. | H04N 9/3117 345/204 |
| 2006/0098128 A1* | 5/2006 | Conner | ................ | H04N 9/3188 349/5 |
| 2014/0232995 A1* | 8/2014 | Okamoto | ........... | G02B 27/0961 353/38 |
| 2018/0246398 A1* | 8/2018 | Shishido | .............. | G03B 21/006 |

FOREIGN PATENT DOCUMENTS

| | | | |
|---|---|---|---|
| JP | 2006-017931 | | 1/2006 |
| JP | 2006017931 A | * | 1/2006 |
| JP | 2008-145546 | | 6/2008 |
| JP | 2011-215459 | | 10/2011 |
| JP | 2011215459 A | * | 10/2011 |
| JP | 2014182269 A | * | 9/2014 |
| WO | WO 2016/098281 | | 6/2016 |

* cited by examiner

DISPLAY APPARATUS THAT TIME-DIVISIONALLY ILLUMINATES DIFFERENT PIXEL REGIONS WITH DIFFRACTED COLOR LIGHT BEAMS

CROSS REFERENCE TO RELATED APPLICATIONS

This application is a national stage application under 35 U.S.C. 371 and claims the benefit of PCT Application No. PCT/JP2019/048416 having an international filing date of 11 Dec. 2019, which designated the United States, which PCT application claimed the benefit of Japanese Patent Application No. 2019-010059 filed 24 Jan. 2019, the entire disclosures of each of which are incorporated herein by reference.

TECHNICAL FIELD

The present disclosure relates to a display apparatus using a diffraction element.

BACKGROUND ART

There is a system called a three-panel system, for a projector, to perform full-color display by using three spatial light modulation elements (light intensity modulation elements) that display monochromatic images of respective colors of R (red), G (green), and B (blue) and then combining the monochromatic images of the respective colors in an optical system. Examples of the spatial light modulation element include reflective devices such as LCOS (Liquid Crystal on Silicon) and DMD (Digital Micromirror Device) and transmissive devices such as and HTPS (High Temperature Poly-Silicon TFT. However, a space required to install an optical element for performing optical separation and optical combining according to the respective colors makes it difficult to miniaturize a projector, and also increases costs of members. In contrast, there has been known a projector of a single-panel system using one spatial light modulation element, and, among those, there is a system called a field sequential (FS) system (e.g., see PTLs 1 to 2). The single-panel system is a system more effective for miniaturization than the three-panel system.

CITATION LIST

Patent Literature

PTL 1: Japanese Unexamined Patent Application Publication No. 2011-215459
PTL 2: Japanese Unexamined Patent Application Publication No. H9-214997

SUMMARY OF THE INVENTION

In the case of the single-panel system, in particular, the field sequential system, light utilization efficiency is lowered as compared with the three-panel system. In addition, in a case where switching among the colors is slow, a phenomenon of color break occurs, in which the switching among the colors ends up being recognized.

It is desirable to provide a display apparatus that makes it possible to improve light utilization efficiency and image quality without complicating a configuration.

A display apparatus according to an embodiment of the present disclosure includes: a light source unit that emits a plurality of color light beams having wavelengths different from one another; a light intensity modulation element including a plurality of pixels, and subjecting the plurality of color light beams to intensity modulation to generate an image; a diffraction element configured to simultaneously illuminate at least two pixel regions at pixel positions different from each other, with color light beams different from each other, by diffracting the respective color light beams from the light source unit toward a plurality of pixel regions at pixel positions different from one another on the light intensity modulation element; and a control unit that changes diffraction angles of the respective color light beams in the diffraction element within a predetermined period, and sequentially switches illumination regions for the plurality of pixel regions by the respective color light beams, to allow all of the plurality of color light beams to time-divisionally illuminate any pixel region of the plurality of pixel regions within the predetermined period.

In the display apparatus according to an embodiment of the present disclosure, the diffraction element simultaneously illuminates at least two pixel regions at pixel positions different from each other, with color light beams different from each other, by diffracting the respective color light beams from the light source unit toward a plurality of pixel regions at pixel positions different from one another on the light intensity modulation element. The control unit changes diffraction angles of the respective color light beams in the diffraction element within a predetermined period, and sequentially switches illumination regions for the plurality of pixel regions by the respective color light beams, to allow all of the plurality of color light beams to time-divisionally illuminate any pixel region of the plurality of pixel regions within the predetermined period.

MODES FOR CARRYING OUT THE INVENTION

Figure 1:
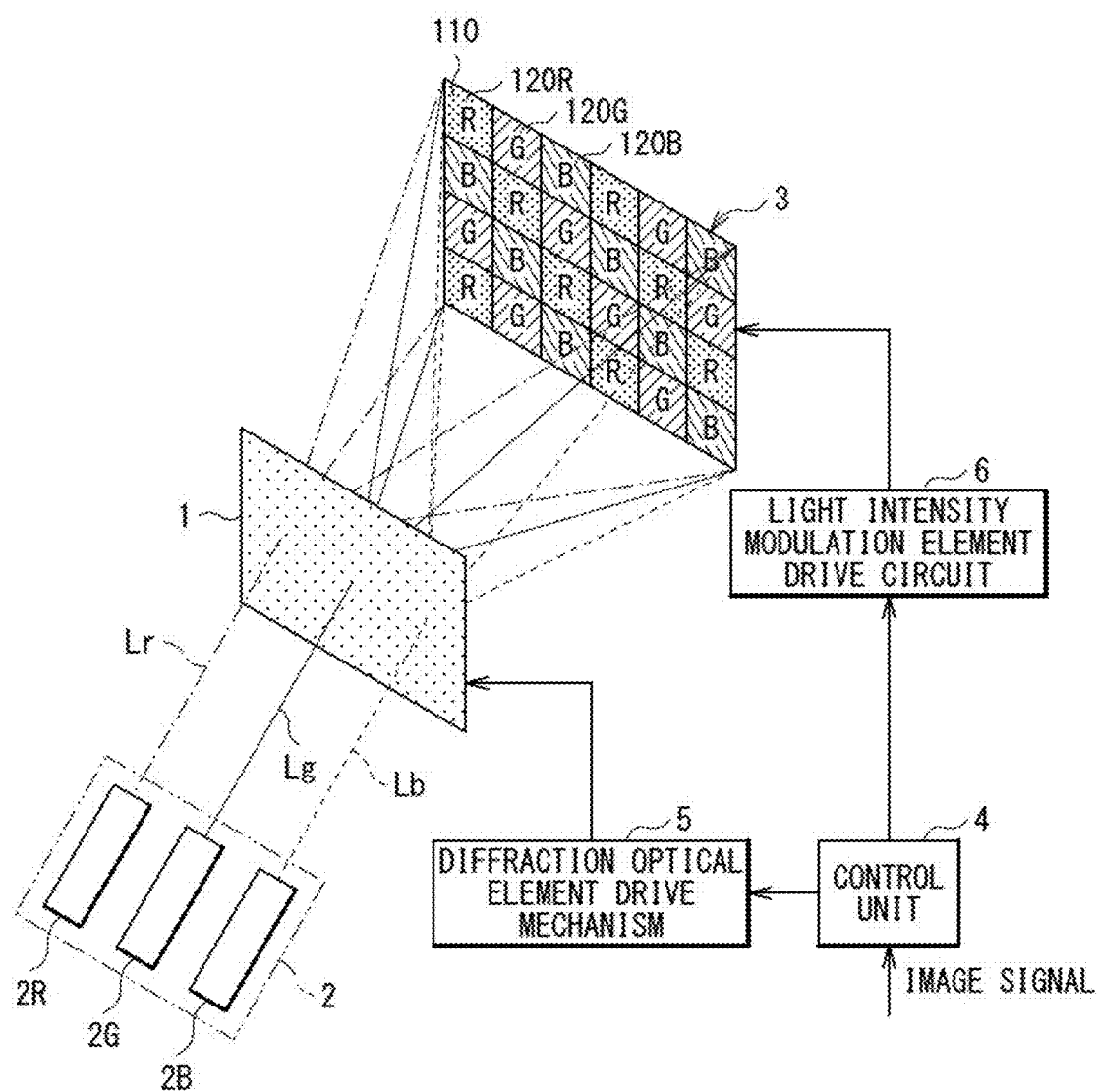
FIG. 1 is a configuration diagram schematically illustrating an example of a display apparatus according to a first embodiment of the present disclosure.

Hereinafter, description is given in detail of embodiments of the present disclosure with reference to the drawings. It is to be noted that the description is given in the following order.

0. Comparative Example
   1. First Embodiment (FIGS. 1 to 9)
      1.1 Configuring and Operation of Display Apparatus
      1.2 Specific Examples of Diffraction Optical Element
      1.3 Effects
   2. Second Embodiment (FIGS. 10 to 11)
   3. Third Embodiment (FIG. 12)
   4. Fourth Embodiment (FIGS. 13 to 15)
   5. Fifth Embodiment (FIGS. 16 to 17)
   6. Sixth Embodiment (FIGS. 18 to 21)
   7. Other Embodiments 0. Comparative Example (Overview and Issue of Display Apparatus of Comparative Example)

In the case of a display apparatus such as a projector by a single-panel system, in particular, a field sequential system, full-color display is performed, for example, by sequentially switching monochromatic images of respective colors of R, G, and B temporally, thus making it possible to reduce a space required to dispose spatial light modulation elements (light intensity modulation elements) of respective colors as well as optical members of the respective colors for optical separation and optical combining. Therefore, the single-panel system is more advantageous for miniaturization than a three-panel system.

Meanwhile, in the field sequential system, colors need to be sequentially switched temporally. Thus, for example, in a case where it is assumed that image display is performed while three colors of R, G, and B are switched in identical display periods for the respective colors, the respective colors are able to be displayed for only ⅓ of the periods as compared with the three-panel system, thus lowering light utilization efficiency as compared with the three-panel system. Further, in a case where the switching among the respective colors is slow, a phenomenon of color break occurs, in which the switching among the colors ends up being recognized.

For example, PTL 1 (Japanese Unexamined Patent Application Publication No. 2011-215459) proposes, as a system for reducing the lowering of light utilization efficiency and the color break, a system that causes respective colors to be incident on microlenses on a spatial light modulation element while sequentially switching incident angles of the respective colors to thereby distribute the respective colors to corresponding pixels for displaying, thus combining images of three colors. However, an apparatus that separates and switches the incident angles of the respective colors becomes extensive, and it is necessary to accurately adjust the incident angles to the microlenses, thus there is a concern about deterioration of the productivity. Further, the microlenses are required for distribution of pixels, and thus application to a reflective device is difficult as a spatial light modulation element, which limits types of the spatial light modulation element. In addition, a positional relationship between the pixels and the microlenses needs to be accurately controlled, thus causing deteriorated yields and lowered image quality.

In addition, PTL 2 (Japanese Unexamined Patent Application Publication No. H9-214997) proposes a system of providing a coherent light source as a light source and temporally changing illumination angles of respective colors by a deflection section and a diffraction section, in order to simplify angle separation and switching among the respective colors. It is necessary for such a technique to cause respective color light beams from a light source to pass through two optical elements of the deflection section and the diffraction section, thus causing lowered light utilization efficiency each time the color light beams pass through the optical elements. Further, the issue of accuracy of incidence of illumination light on the corresponding pixel in the spatial light modulation element still remains, and productivity and lowered image quality are also issues.

It is therefore desired to develop a display apparatus that makes it possible to improve light utilization efficiency and image quality without complicating a configuration.

1. First Embodiment

[1.1 Configuration and Operation]

FIG. 1 schematically illustrates a configuration example of a display apparatus according to a first embodiment of the present disclosure.

The display apparatus according to the first embodiment includes a diffraction optical element 1, a light source unit 2, a light intensity modulation element 3, a control unit 4, a diffraction optical element drive mechanism 5, and a light intensity modulation element drive circuit 6.

The display apparatus according to the first embodiment is suitable for a projector, for example. However, the display apparatus according to the first embodiment is also applicable to an apparatus other than the projector. In the case of application to the projector, for example, a projection optical system is further provided to enlarge a projected image generated by the light intensity modulation element 3 and project the enlarged projected image onto an unillustrated projection surface such as a screen.

The light source unit 2 includes a plurality of light sources that emit a plurality of color light beams having wavelengths different from one another. The plurality of light sources are, for example, coherent light sources including laser diodes that oscillate at wavelengths different from one another, and each emit, as a color light beam, laser light which is coherent light. FIG. 1 illustrates a configuration example in which the light source unit 2 includes a red light source 2R that emits red light Lr, a green light source 2G that emits green light Lg, and a blue light source 2B that emits blue light Lb.

The light intensity modulation element 3 includes a plurality of pixels, and subjects the plurality of color light beams to intensity modulation to generate an image. The light intensity modulation element 3 is configured by, for example, an intensity modulation liquid crystal panel, or the like. The light intensity modulation element 3 may be of a transmissive type or a reflective type.

The diffraction optical element 1 corresponds to a specific example of a "diffraction element" in a technique of the present disclosure. The diffraction optical element 1 diffracts respective color light beams from the light source unit 2 toward a plurality of pixel regions 110 at pixel positions different from one another in the light intensity modulation element 3. This enables the diffraction optical element 1 to simultaneously illuminate at least two pixel regions 110 at pixel positions different from one another by color light beams different from one another. The color light beams from the light source unit 2 are each incident on the diffraction optical element 1 at certain incident angles. The diffraction optical element 1 includes a plurality of diffraction regions of different diffraction angles for each of the plurality of color light beams.

Figure 2:
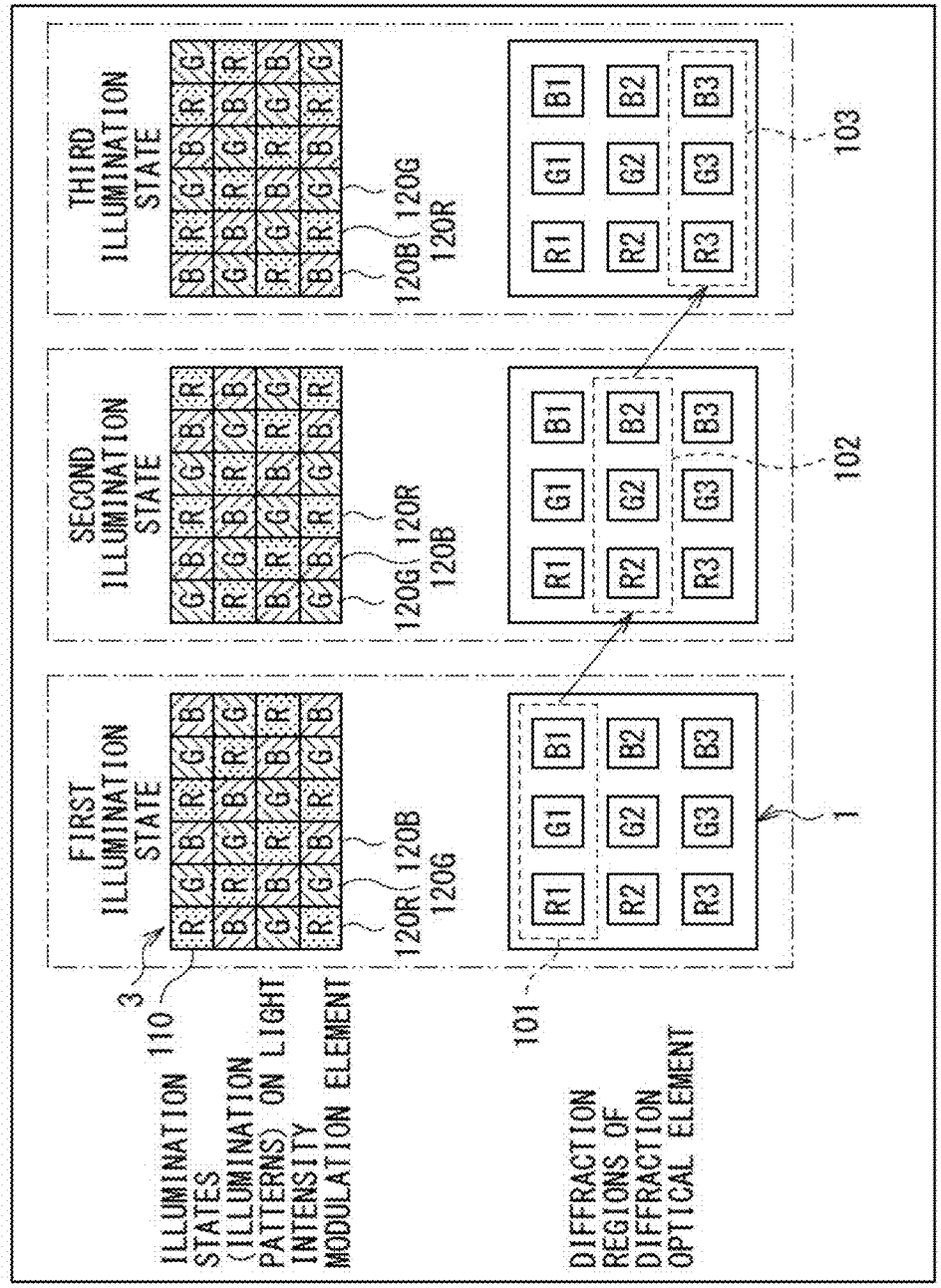
FIG. 2 is an explanatory diagram schematically illustrating an example of a relationship between illumination states on a light intensity modulation element and a plurality of diffraction regions of a diffraction element (a diffraction optical element) in the display apparatus according to the first embodiment.

FIG. 2 schematically illustrates an example of a relationship between illumination states on the light intensity modulation element 3 and the plurality of diffraction regions of the diffraction optical element 1 in the display apparatus according to the first embodiment. FIG. 2 illustrates, in the upper part, an example of illumination states (illumination patterns) on the light intensity modulation element 3. FIG. 2 illustrates, in the lower part, an example of the plurality of diffraction regions of the diffraction optical element 1. FIG. 2 illustrates an example of including, as the plurality of diffraction regions, a first diffraction region 101, a second diffraction regions 102, and a third diffraction region 103. In the lower part of FIG. 2, for example, Rx (x=1 to 3) corresponds to an x-th illumination state of the red light Lr. The first diffraction region 101, the second diffraction region 102, and the third diffraction region 103 each include a diffraction section (Rx, Gx, and Bx) corresponding to the respective color light beams. In addition, FIG. 1 and the upper part of FIG. 2 illustrate an example of including a red illumination region 120R, a green illumination region 120G, and a blue illumination region 120B, as a plurality of illumination regions on the light intensity modulation element 3.

The control unit 4 changes diffraction angles of the respective color light beams in the diffraction optical element 1 within a predetermined period (e.g., one frame period), and sequentially switches illumination regions for the plurality of pixel regions 110 by the respective color light beams, to allow all of the plurality of color light beams to time-divisionally illuminate any pixel region 110 of the plurality of pixel regions 110 within the predetermined period. At this time, in order to improve the light utilization efficiency, it is preferable to switch illumination regions to allow the light intensity modulation element 3 to be constantly illuminated by the plurality of color light beams (e.g., three colors of R, G, and B).

For example, as illustrated in FIGS. 5 to 9 described later, the control unit 4 sequentially switches illumination regions for the plurality of pixel regions 110 by the respective color light beams by moving the diffraction optical element 1 to allow the respective color light beams from the light source unit 3 to be sequentially incident on the plurality of diffraction regions time-divisionally within the predetermined period. For example, FIG. 2 illustrates an example in which illumination states for the plurality of pixel regions 110 are switched in the order of a first illumination state, a second illumination state, and a third illumination state, within the predetermined period (e.g., one frame period). In the first illumination state, the respective color light beams from the light source unit 3 are incident on the first diffraction region 101 of the diffraction optical element 1. In the second illumination state, the respective color light beams from the light source unit 3 are incident on the second diffraction region 102 of the diffraction optical element 1. In the third illumination state, the respective color light beams from the light source unit 3 are incident on the third diffraction region 103 of the diffraction optical element 1. This allows for sequential switching among positions of the red illumination region 120R, the green illumination region 120G, and the blue illumination region 120B, for the plurality of pixel regions 110 on the light intensity modulation element 3.

The diffraction optical element drive mechanism 5 corresponds to an example of a "drive mechanism" in a technique of the present disclosure. The diffraction optical element drive mechanism 5 drives the diffraction optical element 1 under the control of the control unit 4. The control unit 4 sequentially switches illumination regions for the plurality of pixel regions 110 by the respective color light beams in the light intensity modulation element 3 by sequentially switching diffraction regions on which the respective color light beams from the light source unit 3 are incident by controlling the diffraction optical element drive mechanism 5.

The light intensity modulation element drive circuit 6 drives the light intensity modulation element 3 under the control of the control unit 4. The control unit 4 controls the light intensity modulation element drive circuit 6 on the basis of an inputted image signal. This allows a desired image to be displayed on the light intensity modulation element 3.

Figure 3:
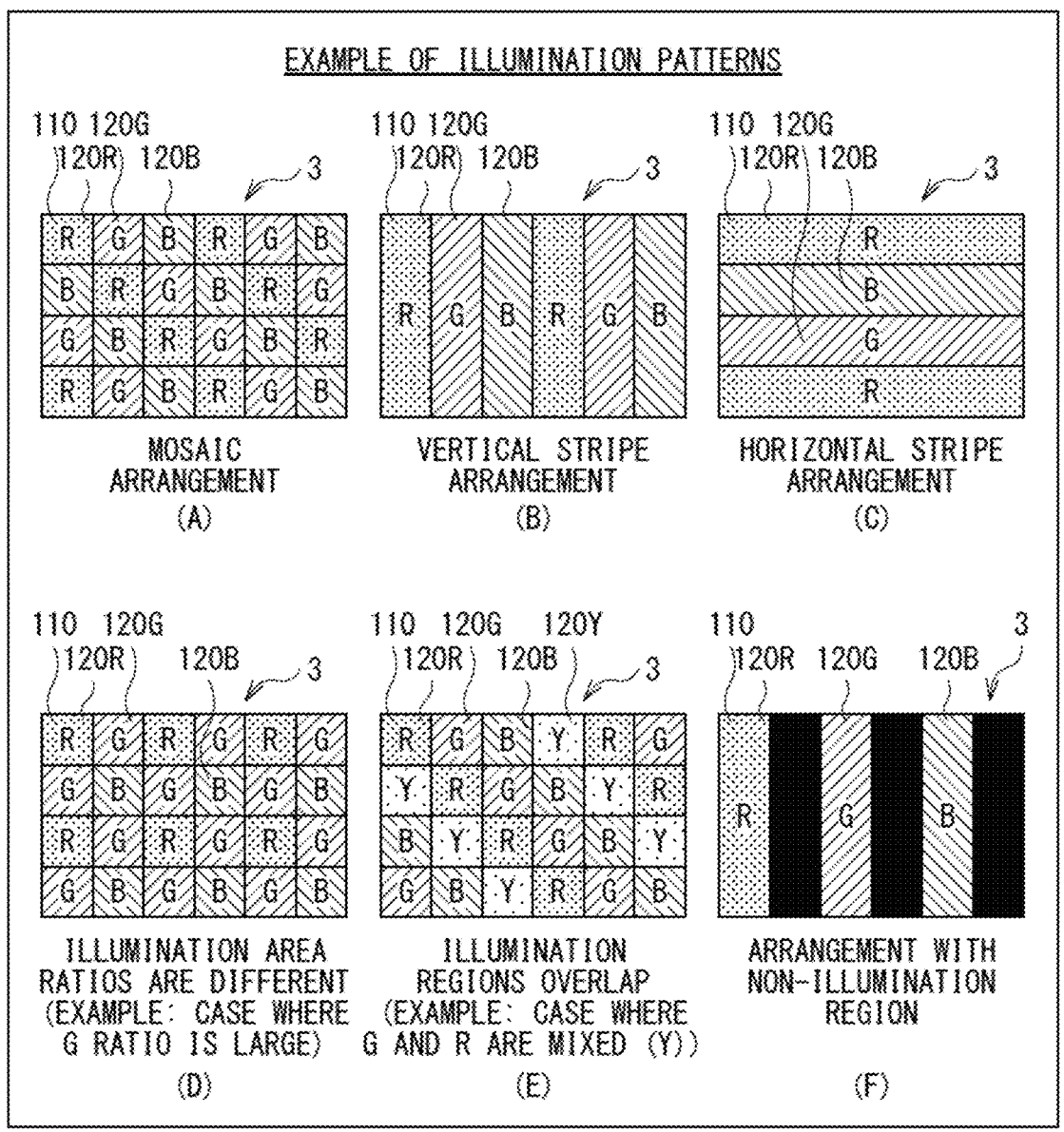
FIG. 3 is an explanatory diagram schematically illustrating an example of various illumination patterns for the light intensity modulation element made by the diffraction optical element in the display apparatus according to the first embodiment.

FIG. 3 schematically illustrates an example of various illumination patterns for the light intensity modulation element 3 made by the diffraction optical element 1 in the display apparatus according to the first embodiment. It is to be noted that FIG. 3 illustrates the example of illumination patterns within an arbitrary illumination period (e.g., one subframe period) within the predetermined period (e.g., one frame period).

The pattern (illumination pattern) of the illumination region for the light intensity modulation element 3 may be such a pattern that each pixel region 110 is illuminated at least once by each color light beam within the predetermined period. For example, various illumination patterns may be employed, such as a mosaic arrangement ((A) of FIG. 3), a vertical stripe arrangement ((B) of FIG. 3), a horizontal stripe arrangement ((C) of FIG. 3), an arrangement in which illumination area ratios of the colors are different ((D) of FIG. 3), an arrangement in which illumination regions of the respective colors overlap ((E) of FIG. 3), or an arrangement with a non-illumination region ((F) of FIG. 3). The number of divisions, the shape of division, illuminance, and the like of the illumination region may be freely set for a displayed image. It is to be noted that (D) of FIG. 3 illustrates an example in which the illumination area ratio of the green illumination region 120G is larger than those of the red illumination region 120R and the blue illumination region 120B. In addition, (E) of FIG. 3 illustrates, as an example of the arrangement in which the illumination regions of the respective colors overlap, an example in which the red illumination region 120R and the green illumination region 120G partially overlap to thereby form a mixed color (yellow (Y)) illumination region 120Y.

(Example of Generation of Diffraction Region of Diffraction Optical Element 1)

The plurality of diffraction regions of the diffraction optical element 1 may perform diffraction by a hologram, for example. The plurality of diffraction regions may be a hologram generated, for example, by a computer-generated hologram (Computer Generated Hologram: CGH). Known examples of a CGH generation method include a Gerchberg-Saxton method (GS method) for generation of target phase distribution data (target phase distribution data) by repeating Fourier transform. Phase distribution corresponding to such phase distribution data is implemented by, for example, a structure with an uneven pattern formed on a resin substrate, called a surface relief type, and is formed by a pattern transfer method of pressing a mold called nanoimprint. It is to be noted that the diffraction optical element 1 is not limited to a diffraction element based on the CGH, and another surface relief type diffraction optical element, a volume type diffraction optical element produced by two-beam interferometry, or the like may be used.

(Example of Generation of Target Phase Distribution Data)

Figure 4:
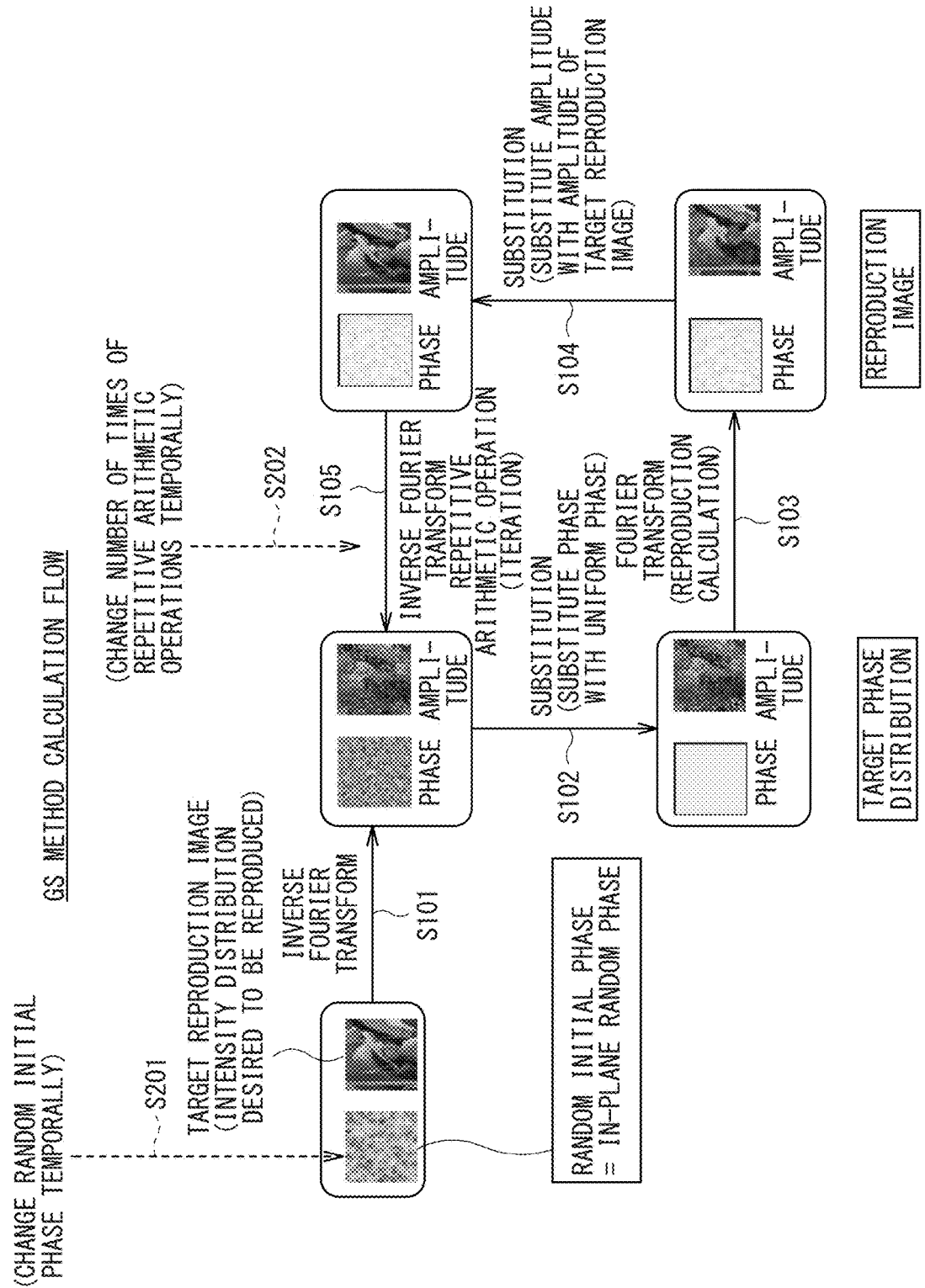
FIG. 4 is an explanatory diagram illustrating an example of a generation method of target phase distribution data in the display apparatus according to the first embodiment.

FIG. 4 illustrates an example of a method of generation of target phase distribution data in the display apparatus according to the first embodiment.

FIG. 4 illustrates an example of a method of generation of the target phase distribution data in the display apparatus according to the first embodiment. It is to be noted that, although description is given here by exemplifying a case where the GS method is used to generate the target phase distribution data, the calculation method for the phase distribution may be other than the GS method. Examples of the calculation method for the phase distribution include a method of a diffraction type in which the phase distribution is derived from a diffraction approximation equation of a Fresnel region or a Fraunhofer region and a method of a refractive type in which the phase distribution is derived as a free-form surface lens rather than the diffraction. The GS method is a method that derives the phase distribution from the diffraction approximation equation of a Fraunhofer region; however, the calculation method for the phase distribution in the present disclosure is not limited thereto.

As illustrated in FIG. 4, an unillustrated phase distribution arithmetic circuit may use, as a predetermined phase distribution calculation method, the GS method to generate the target phase distribution data.

The phase distribution arithmetic circuit gives a random initial phase as an initial condition to a target reproduction image with intensity distribution desired to be reproduced, and performs inverse Fourier transform (step S101). The phase distribution arithmetic circuit may substitute a phase, of a phase and amplitude obtained thereby, with a uniform phase (step S102) to obtain a target phase distribution. Here, one reason for the substitution with the uniform phase is that the diffraction element in the first embodiment is assumed to perform the reproduction using collimated light.

Next, the phase distribution arithmetic circuit performs Fourier transform on the phase and the amplitude obtained in step S102 to thereby perform reproduction calculation (step S103). This allows for calculation of a reproduction image.

Next, the phase distribution arithmetic circuit substitutes the amplitude, of the phase and the amplitude obtained in step S103, with amplitude of the target reproduction image (step S104).

Next, the phase distribution arithmetic circuit performs inverse Fourier transform on the phase and the amplitude obtained in step S104 (step S105), and thereafter performs a repetitive arithmetic operation (iteration) that repeats the calculations of steps S102 to S105. The repetitive arithmetic operation may be performed until a reproduction image of satisfactory quality is obtained as the target reproduction image.

In a case where an identical target reproduction image is to be reproduced throughout a plurality of frames or a plurality of subframes in the diffraction element, the phase distribution arithmetic circuit may temporally change at least the random initial phase, of the above arithmetic operations by the GS method, for each frame or for each subframe, to thereby change phase distribution of the target phase distribution data (step S201).

In addition, in a similar case, the phase distribution arithmetic circuit may temporally change at least the number of times of the repetitive arithmetic operations, of the above arithmetic operations by the GS method, to thereby change phase distribution of the target phase distribution data (step S202).

[1.2 Specific Examples of Diffraction Optical Element]

Figure 5:
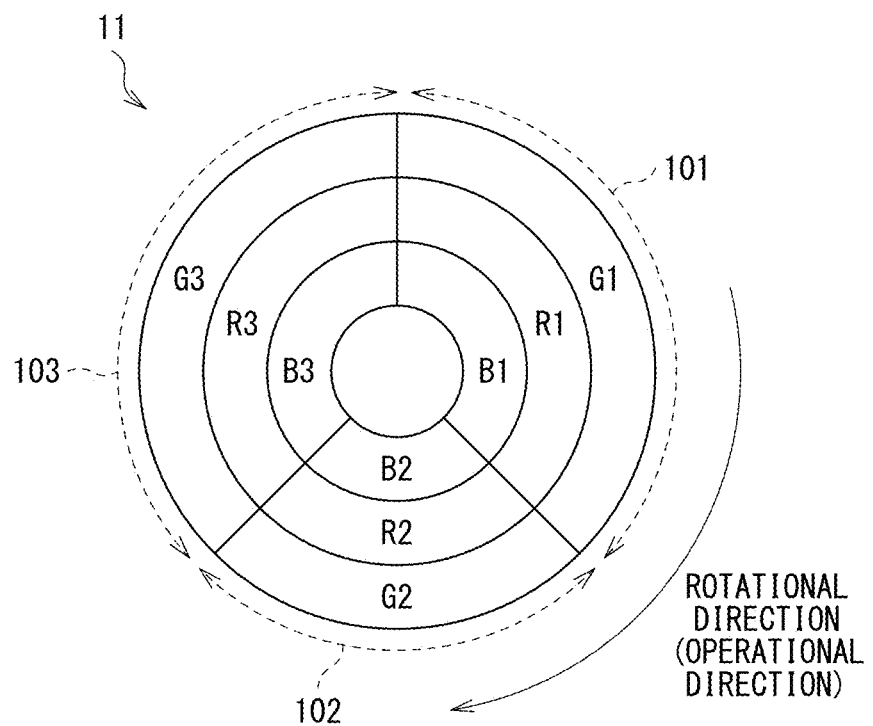
FIG. 5 is a configuration diagram schematically illustrating a first specific example of a main part configuration and an operation of a diffraction optical element in the display apparatus according to the first embodiment.
Figure 6:
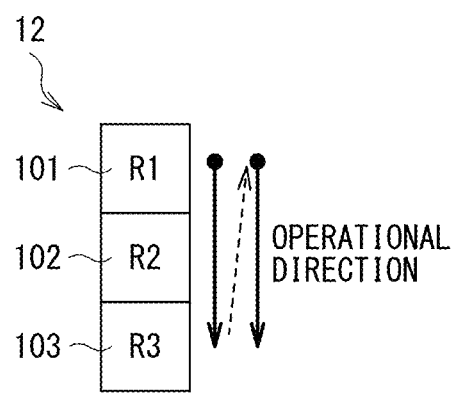
FIG. 6 is a configuration diagram schematically illustrating a second specific example of the main part configuration and the operation of the diffraction optical element in the display apparatus according to the first embodiment.
Figure 7:
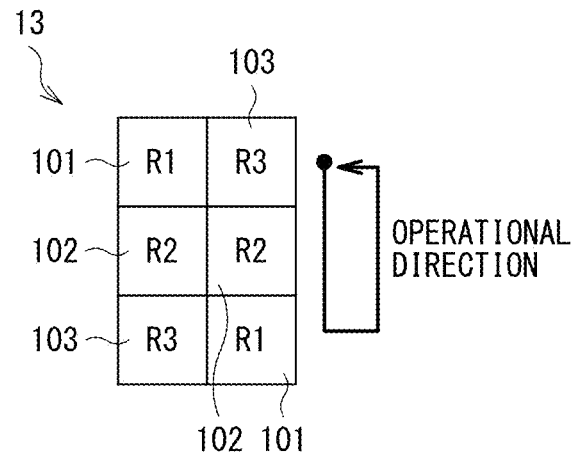
FIG. 7 is a configuration diagram schematically illustrating a third specific example of the main part configuration and the operation of the diffraction optical element in the display apparatus according to the first embodiment.
Figure 8:
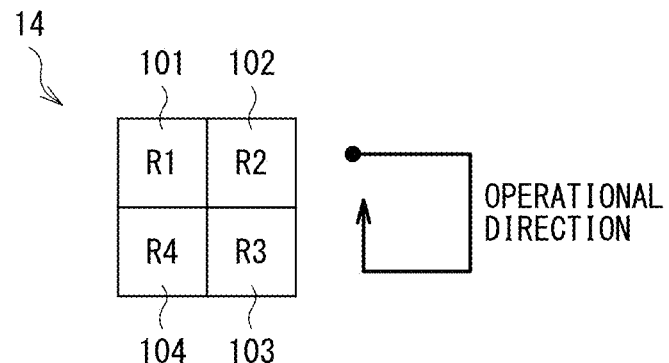
FIG. 8 is a configuration diagram schematically illustrating a fourth specific example of the main part configuration and the operation of the diffraction optical element in the display apparatus according to the first embodiment.
Figure 9:
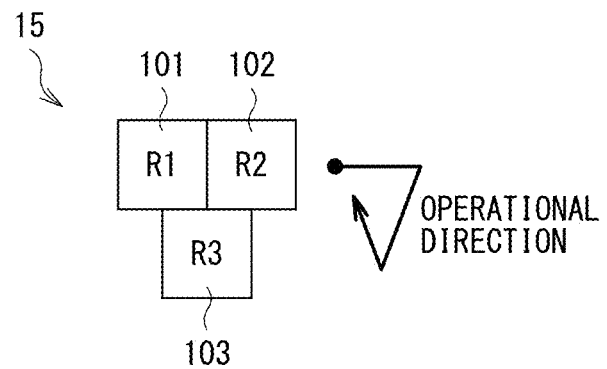
FIG. 9 is a configuration diagram schematically illustrating a fifth specific example of the main part configuration and the operation of the diffraction optical element in the display apparatus according to the first embodiment.

FIGS. 5 to 9 each schematically illustrate a specific example of a main part configuration and an operation of the diffraction optical element 1 in the display apparatus according to the first embodiment. FIG. 5 schematically illustrates a main part configuration and an operation of a diffraction optical element 11 according to a first specific example. FIG. 6 schematically illustrates a main part configuration and an operation of a diffraction optical element 12 according to a second specific example. FIG. 7 schematically illustrates a main part configuration and an operation of a diffraction optical element 13 according to a third specific example. FIG. 8 schematically illustrates a main part configuration and an operation of a diffraction optical element 14 according to a fourth specific example. FIG. 9 schematically illustrates a main part configuration and an operation of a diffraction optical element 15 according to a fifth specific example.

The diffraction optical element 11 according to the first specific example illustrated in FIG. 5 has a configuration in which a rotational operation enables switching among diffraction regions on which the respective color light beams from the light source unit 3 are incident. Similarly to the lower part of FIG. 2, FIG. 5 illustrates an example of including, as the plurality of diffraction regions, the first diffraction region 101, the second diffraction region 102, and the third diffraction region 103. Similarly to the lower part of FIG. 2, the first diffraction region 101, the second diffraction region 102, and the third diffraction region 103 each include the diffraction sections (Rx, Gx, and Bx) corresponding to the respective color light beams.

The diffraction optical element 11 according to the first specific example includes the diffraction regions (diffraction sections), corresponding to the respective colors and the respective illumination regions, installed or directly formed on a rotating substrate, for example. The diffraction optical element drive mechanism 5 drives the diffraction optical element 11 to rotate under the control of the control unit 4. For example, the diffraction optical element drive mechanism 5 includes a motor attached to the center of the rotating substrate; the rotation of the rotating substrate by the motor drive allows for sequential switching among the diffraction regions on which the respective color light beams from the light source unit 3 are incident.

It is to be noted that the number and the arrangement of the plurality of diffraction regions are not limited to the example illustrated in FIG. 5, and the number of divisions of the illumination regions for the light intensity modulation element 3 and the type of the color light beams are desirably adjusted depending on incident positions of the respective color light beams. In addition, the switching operation of the diffraction optical element 1 by the diffraction optical element drive mechanism 5 may be not only the rotational operation but also a translational operation, or may be a combination of a plurality of operations.

FIGS. 6 to 9 each illustrate, as the plurality of diffraction regions, only a plurality of diffraction sections Rx (x=1 to 3 or 1 to 4) corresponding to red light.

The diffraction optical element 12 according to the second specific example illustrated in FIG. 6 includes the first diffraction region 101, the second diffraction region 102, and the third diffraction region 103 which are arranged in series, and is configured to be able to switch the diffraction regions by a linear operation.

The diffraction optical element 13 according to the third specific example illustrated in FIG. 7 includes the first diffraction region 101, the second diffraction region 102, and the third diffraction region 103 which are arranged in two rows in series, and is configured to be able to switch the diffraction regions by a rectangular operation.

The diffraction optical element 14 according to the fourth specific example illustrated in FIG. 8 includes the first diffraction region 101, the second diffraction region 102, the third diffraction region 103, and a fourth diffraction region 104 which are arranged in a rectangle form, and is configured to be able to switch the diffraction regions by a rectangular operation.

The diffraction optical element 15 according to the fifth specific example illustrated in FIG. 9 includes the first diffraction region 101, the second diffraction region 102, and the third diffraction region 103 which are arranged in a triangular form, and is configured to be able to switch the diffraction regions by a triangular operation.

[1.3 Effects]

As described above, according to the display apparatus of the first embodiment, it is possible to improve light utilization efficiency and image quality without complicating the configuration.

According to the display apparatus of the first embodiment, the switching of illumination light for the light intensity modulation element 3 is achievable only by the diffraction optical element 1, thus enabling miniaturization of the apparatus as well as cost reduction. In addition, the plurality of light sources that emit the plurality of color light beams having different wavelengths are able to be constantly lighted, thus making it possible to improve luminance and light utilization efficiency. In addition, the plurality of color light beams are able to simultaneously illuminate the light intensity modulation element 3, thus enabling reduction of the color break.

It is to be noted that the effects described herein are merely illustrative and not restrictive, and may have other effects. The same applies to the effects of other subsequent embodiments.

2. Second Embodiment

Next, description is given of a display apparatus according to a second embodiment of the present disclosure. It is to be noted that, in the following, components substantially the same as those of the display apparatus according to the foregoing first embodiment are denoted by the same reference numerals, and the descriptions thereof are omitted where appropriate.

Figure 10:
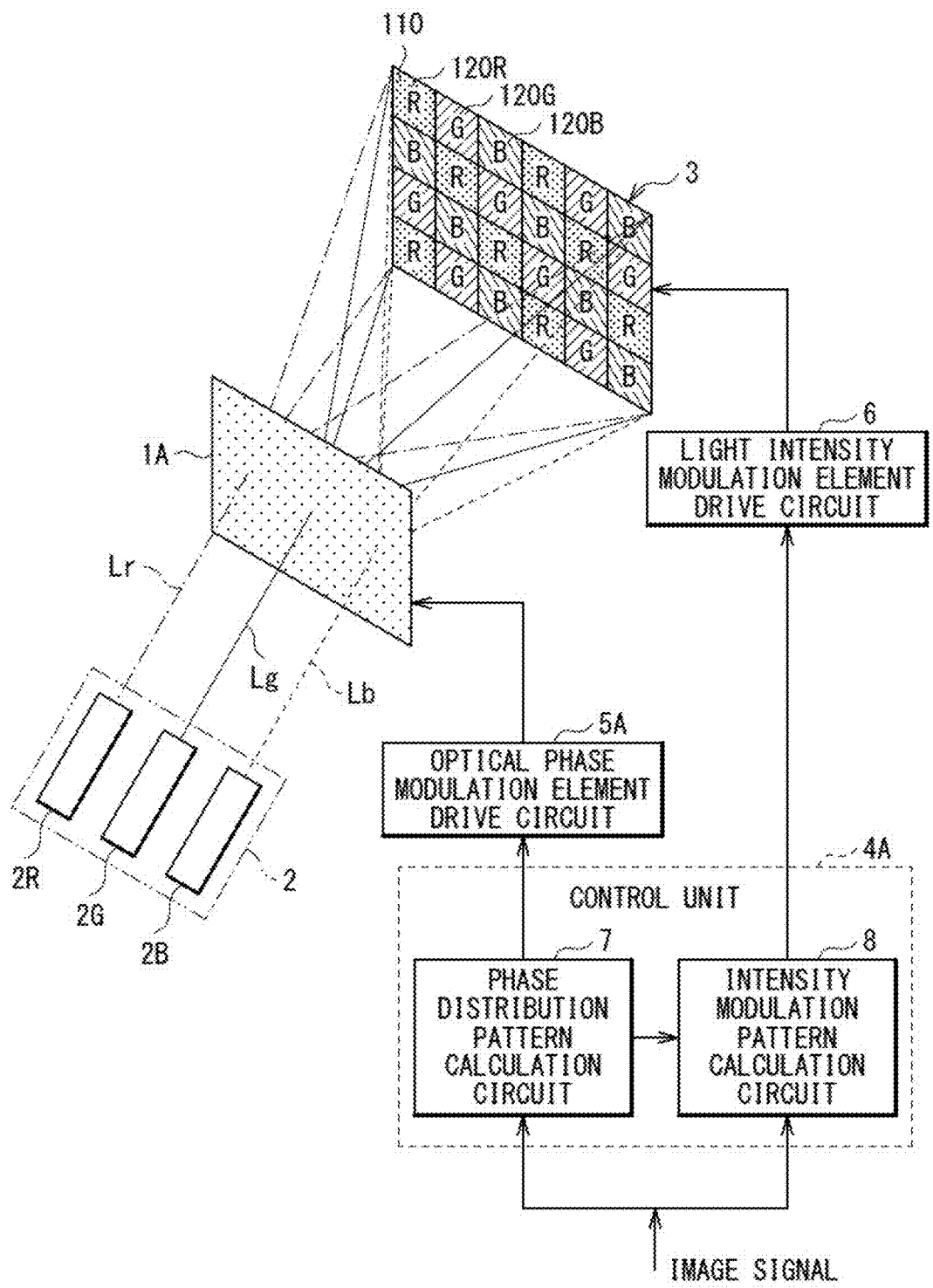
FIG. 10 is a configuration diagram schematically illustrating an example of a display apparatus according to a second embodiment.

FIG. 10 schematically illustrates a configuration example of the display apparatus according to the second embodiment.

The display apparatus according to the second embodiment includes, as a diffraction element, an optical phase modulation element 1A instead of the diffraction optical element 1, in contrast to the configuration of the display apparatus according to the foregoing first embodiment. In addition, the display apparatus according to the second embodiment includes an optical phase modulation element drive circuit 5A instead of the diffraction optical element drive mechanism 5, in contrast to the configuration of the display apparatus according to the foregoing first embodiment. In addition, the display apparatus according to the second embodiment includes a control unit 4A instead of the control unit 4, in contrast to the configuration of the display apparatus according to the foregoing first embodiment. The control unit 4A includes a phase distribution pattern calculation circuit 7 and an intensity modulation pattern calculation circuit 8.

The optical phase modulation element 1A corresponds to a specific example of a "diffraction element" in a technique of the present disclosure. The optical phase modulation element 1A includes diffraction regions for the respective color light beams, on which the respective color light beams from the light source unit 2 are incident, and displays phase distribution patterns for the respective color light beams on the diffraction regions for the respective color light beams, to thereby modulate the phases of the respective color light beams. The optical phase modulation element 1A is configured by, for example, an SLM (Spatial Light Modulator) such as a liquid crystal panel, for example, and displays phase distribution of a CGH, for example, to thereby be able to diffract the respective color light beams. At this time, temporally switching the phase distribution of the diffraction regions in the optical phase modulation element 1A within a predetermined period (e.g., one frame period) makes it possible to sequentially switch illumination regions for the plurality of pixel regions 110 on the light intensity modulation element 3.

Figure 11:
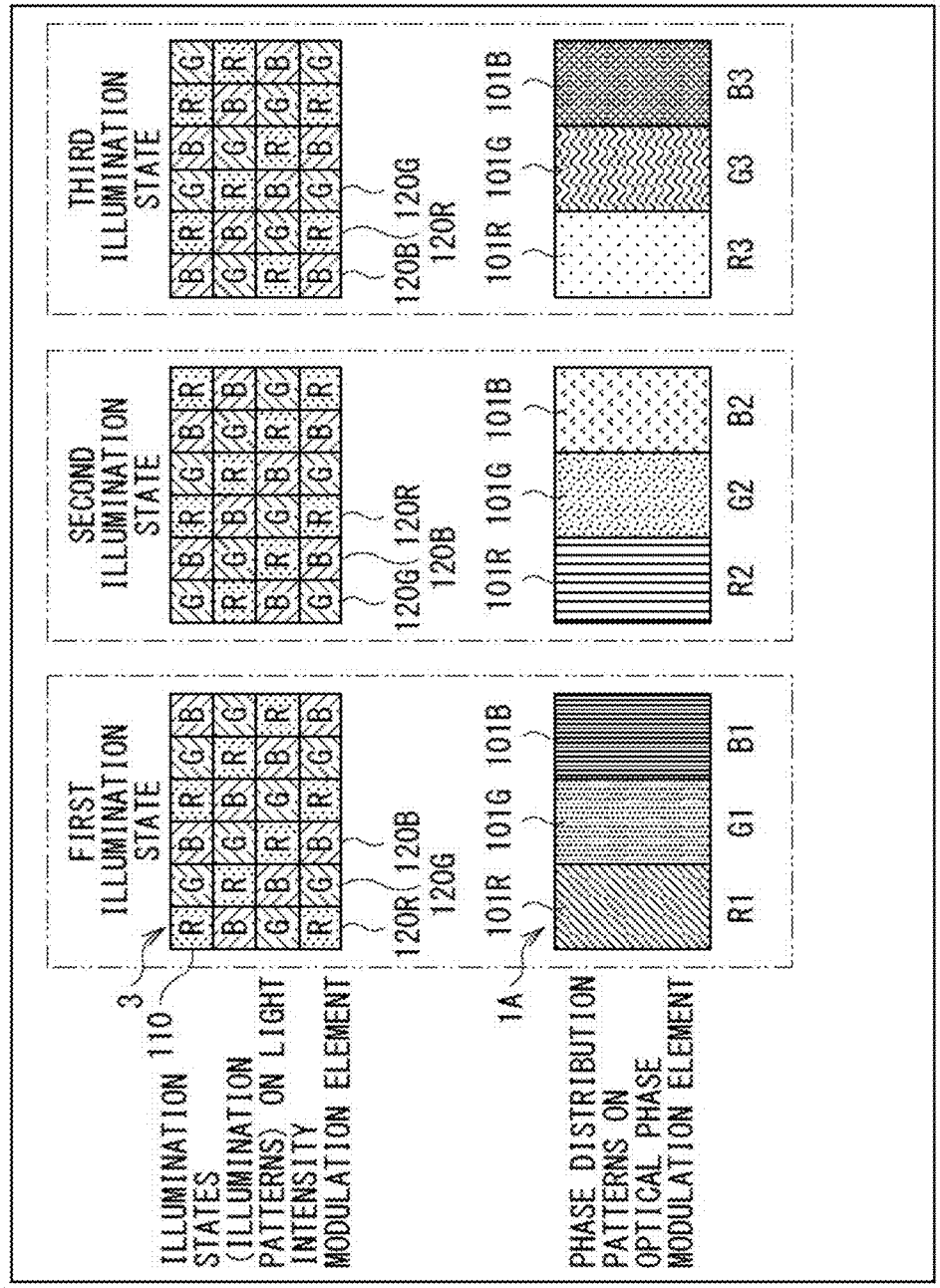
FIG. 11 is an explanatory diagram schematically illustrating an example of a relationship between illumination states on a light intensity modulation element and phase distribution patterns on a diffraction element (optical phase modulation element) in the display apparatus according to the second embodiment.

FIG. 11 schematically illustrates an example of a relationship between illumination states on the light intensity modulation element 3 and the phase distribution patterns on the optical phase modulation element 1A in the display apparatus according to the second embodiment. FIG. 11 illustrates, in the upper part, an example of illumination states (illumination patterns) on the light intensity modulation element 3. FIG. 11 illustrates, in the lower part, an example of a plurality of diffraction regions of the optical phase modulation element 1A. FIG. 11 illustrates an example of including, as the plurality of diffraction regions, a red diffraction region 101R that diffracts the red light Lr, a green diffraction region 101G that diffracts the green light Lg, and a blue diffraction region 101B that diffracts the blue light Lb. In the lower part of FIG. 11, for example, Rx (x=1 to 3) indicates a phase distribution pattern corresponding to an x-th illumination state of the red light Lr. FIGS. 10 and 11 each illustrate, in the upper part, an example of including the red illumination region 120R, the green illumination region 120G, and the blue illumination region 120B, as the plurality of illumination regions on the light intensity modulation element 3.

The control unit 4A sequentially changes the phase distribution patterns for the respective color light beams to be displayed on the optical phase modulation element 1A, time-divisionally within the predetermined period (e.g., one frame period), to thereby sequentially switch illumination regions for the plurality of pixel regions 110 by the respective color light beams.

For example, FIG. 11 illustrates an example in which illumination states for the plurality of pixel regions 110 are switched in the order of the first illumination state, the second illumination state, and the third illumination state within the predetermined period (e.g., one frame period). In the first illumination state, a first phase distribution pattern (R1, G1, and B1) is displayed on each of the red diffraction region 101R, the green diffraction region 101G, and the blue diffraction region 101B in the optical phase modulation element 1A. In the second illumination state, a second phase distribution pattern (R2, G2, and B2) is displayed on each of the red diffraction region 101R, the green diffraction region 101G, and the blue diffraction region 101B in the optical phase modulation element 1A. In the third illumination state, a third phase distribution pattern (R3, G3, and B3) is displayed on each of the red diffraction region 101R, the green diffraction region 101G, and the blue diffraction region 101B in the optical phase modulation element 1A. This allows for sequential switching among positions of the red illumination region 120R, the green illumination region 120G, and the blue illumination region 120B, for the plurality of pixel regions 110 on the light intensity modulation element 3.

The phase distribution pattern calculation circuit 7 calculates phase distribution patterns to be displayed by the optical phase modulation element 1A on the basis of an image signal. On the basis of luminance information included in the image signal, the phase distribution pattern calculation circuit 7 calculates, for the respective color light beams, phase distribution patterns that enable formation of an illumination image having illuminance distribution corresponding to the image to be displayed by the light intensity modulation element 3. The phase distribution patterns to be displayed by the optical phase modulation element 1A may be the phase distribution patterns that enable formation of an illumination image having illuminance distribution corresponding to the image to be displayed.

The intensity modulation pattern calculation circuit 8 calculates intensity modulation patterns for generation of an image to be displayed on the light intensity modulation element 3 on the basis of the image signal. At this time, intensity modulation patterns are calculated by adding information on luminance distribution of the illumination image by the optical phase modulation element 1A.

The light intensity modulation element drive circuit 6 drives the light intensity modulation element 3 to generate the intensity modulation patterns calculated in the intensity modulation pattern calculation circuit 8. This allows a desired image to be displayed on the light intensity modulation element 3.

It is to be noted that the arrangement of the phase distribution patterns to be displayed in the optical phase modulation element 1A is not limited to the example illustrated in FIG. 11, and is desirably adjusted on the optical phase modulation element 1A, depending on incident positions of the respective color light beams and the number of colors to be used.

Other configurations, operations, and effects may be substantially similar to those of the display apparatus according to the foregoing first embodiment.

3. Third Embodiment

Next, description is given of a display apparatus according to a third embodiment of the present disclosure. It is to be noted that, in the following, components substantially the same as those of the display apparatus according to the foregoing first or second embodiment are denoted by the same reference numerals, and the descriptions thereof are omitted where appropriate.

Figure 12:
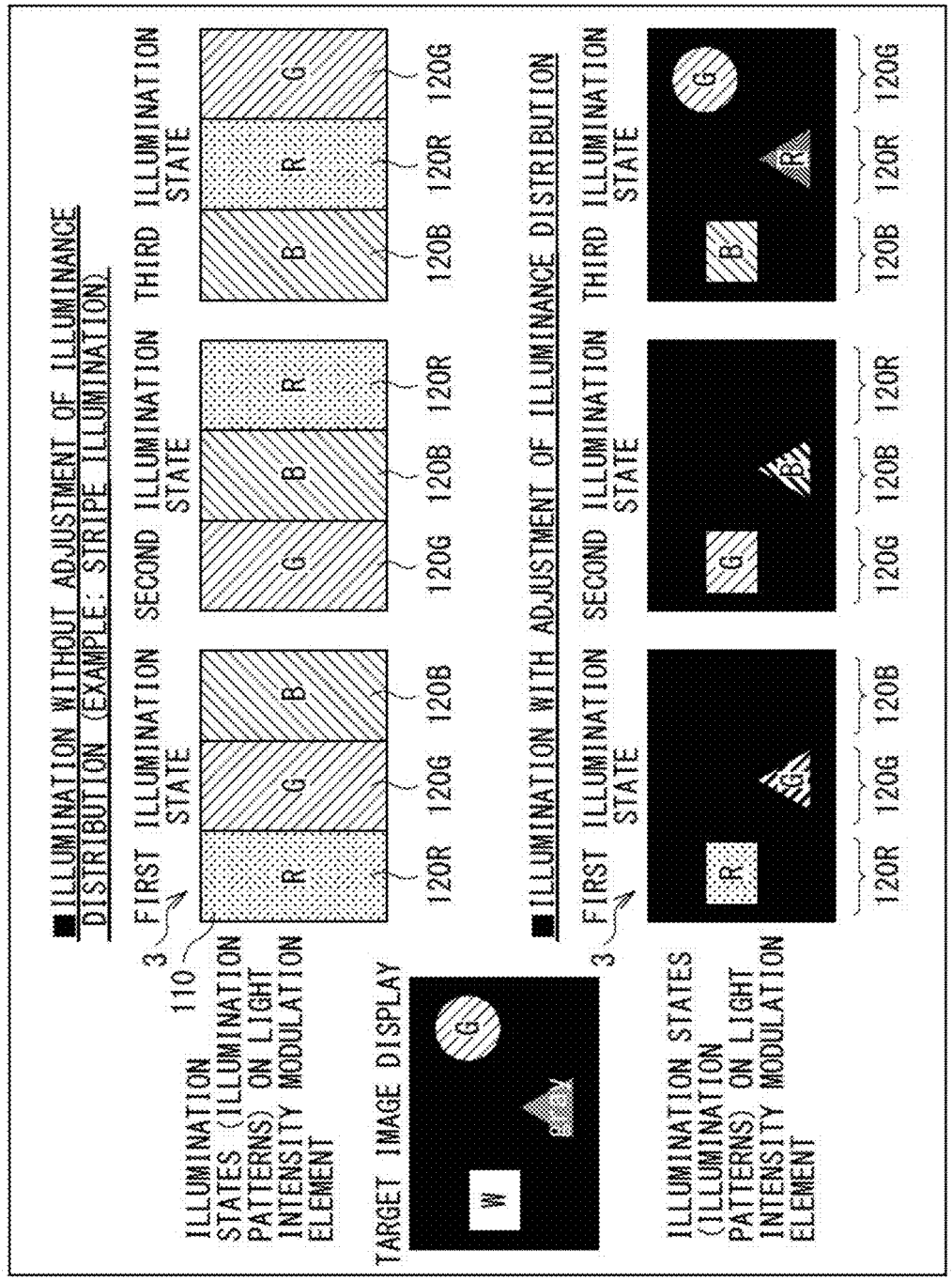
FIG. 12 is an explanatory diagram schematically illustrating an example of illumination states on a light intensity modulation element in a display apparatus according to a third embodiment.

FIG. 12 schematically illustrates an example of illumination states on the light intensity modulation element 3 in the display apparatus according to the third embodiment.

Similarly to the display apparatus according to the foregoing second embodiment, the display apparatus according to the third embodiment includes the optical phase modulation element 1A as the diffraction element. In a case where the optical phase modulation element 1A sequentially changes the phase distribution patterns for the respective color light beams to be displayed on the optical phase modulation element 1A, the phase distribution patterns enable formation of an illumination image having illuminance distribution corresponding to an image to be displayed on the light intensity modulation element 3.

FIG. 12 illustrates an example of a case where the red illumination region 120R, the green illumination region 120G, and the blue illumination region 120B in a stripe form are formed on the light intensity modulation element 3. FIG. 12 schematically illustrates, in the upper part, an example of illumination states in a case where the illuminance distribution is not adjusted in accordance with target image display to be displayed on the light intensity modulation element 3, as the phase distribution patterns of the optical phase modulation element 1A.

FIG. 12 schematically illustrates, in the lower part, an example of illumination states in a case where the illuminance distribution is adjusted in accordance with target image display to be displayed on the light intensity modulation element 3, as the phase distribution patterns of the optical phase modulation element 1A. The phase distribution pattern calculation circuit 7 calculates, on the basis of an image signal, phase distribution patterns to be illuminance distribution according to the target image display. This enables illumination light on the light intensity modulation element 3 combined after elapse of a predetermined period (e.g., one frame period) to have illuminance distribution close to the target image display. This makes it possible to expect improvement in contrast and expansion of a dynamic range of display luminance.

It is to be noted that, although FIG. 12 illustrates, in the lower part, an example of adjusting illuminance distribution based on a case where arrangement of a plurality of illumination regions are in a vertical stripe form, the arrangement of the plurality of illumination regions may be a horizontal stripe arrangement, a mosaic arrangement, or the like. It is sufficient to have illuminance distribution to obtain illuminance necessary for the target image display.

Other configurations, operations, and effects may be substantially similar to those of the display apparatus according to the foregoing second embodiment.

4. Fourth Embodiment

Next, description is given of a display apparatus according to a fourth embodiment of the present disclosure. It is to be noted that, in the following, components substantially the same as those of the display apparatus according to any of the foregoing first to third embodiments are denoted by the same reference numerals, and the descriptions thereof are omitted where appropriate.

In the following, description is given on the basis of the configuration example (FIG. 1) using the diffraction optical element 1 as the diffraction element.

Figure 13:
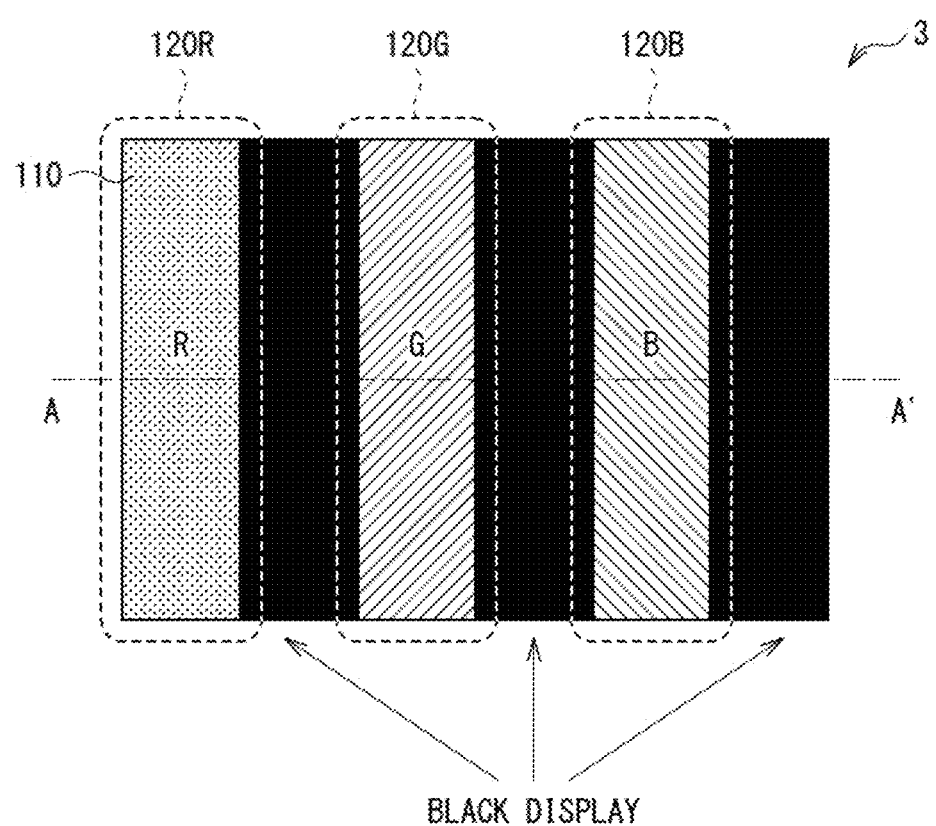
FIG. 13 is an explanatory diagram schematically illustrating an overview of a relationship between an illumination state and a display state of an image on a light intensity modulation element in a display apparatus according to a fourth embodiment.

FIG. 13 schematically illustrates an overview of a relationship between an illumination state and a display state of an image on the light intensity modulation element 3 in the display apparatus according to the fourth embodiment. FIG. 13 illustrates an example of including, as the plurality of illumination regions, the red illumination region 120R, the green illumination region 120G, and the blue illumination region 120B.

In the display apparatus according to the fourth embodiment, the control unit 4 causes the light intensity modulation element 3 to perform image display corresponding to the respective color light beams on the pixel regions 110, of the plurality of pixel regions 110, smaller than illumination regions of the respective color light beams, and to perform black display on other pixel regions 110. The control unit 4 switches pixel regions 110 where the black display is performed at least once within a predetermined period. Sequentially switching the illumination regions of the respective colors until image data corresponding to all colors is written into all pixels in the light intensity modulation element 3 enables full-color display to be performed. This allows for robust positioning accuracy between the plurality of illumination regions and the plurality of pixel regions 110 on the light intensity modulation element 3, thus improving productivity.

It is to be noted that, in FIG. 13, the illumination regions are arranged in a vertical stripe form; however, the illumination regions may be freely arranged as long as such a color arrangement is employed as to enable image data corresponding to all colors to be written into all the pixels.

Figure 14:
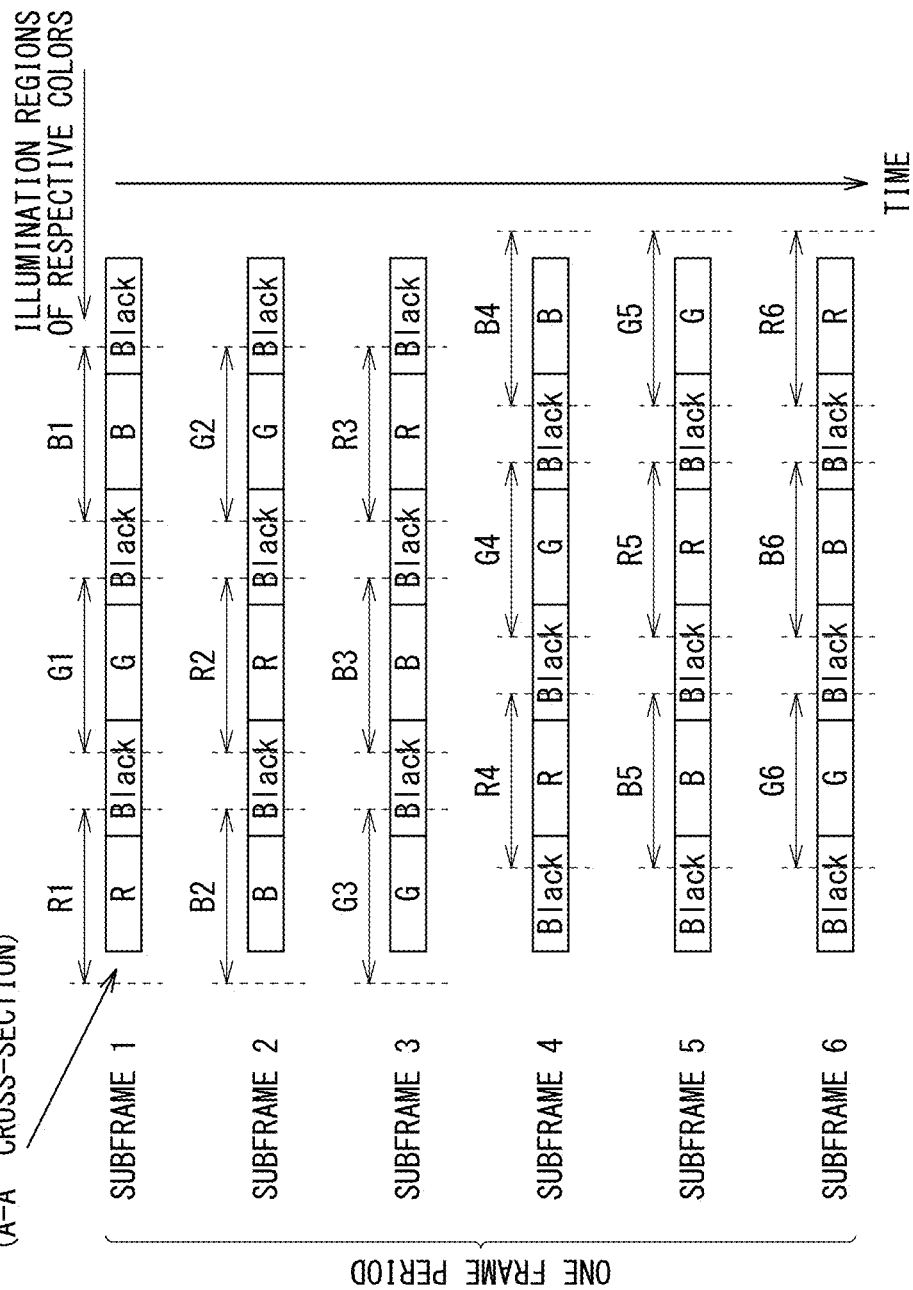
FIG. 14 is an explanatory diagram schematically illustrating a first specific switching example of image display and illumination regions in a plurality of pixel regions on the light intensity modulation element in the display apparatus according to the fourth embodiment.
Figure 15:
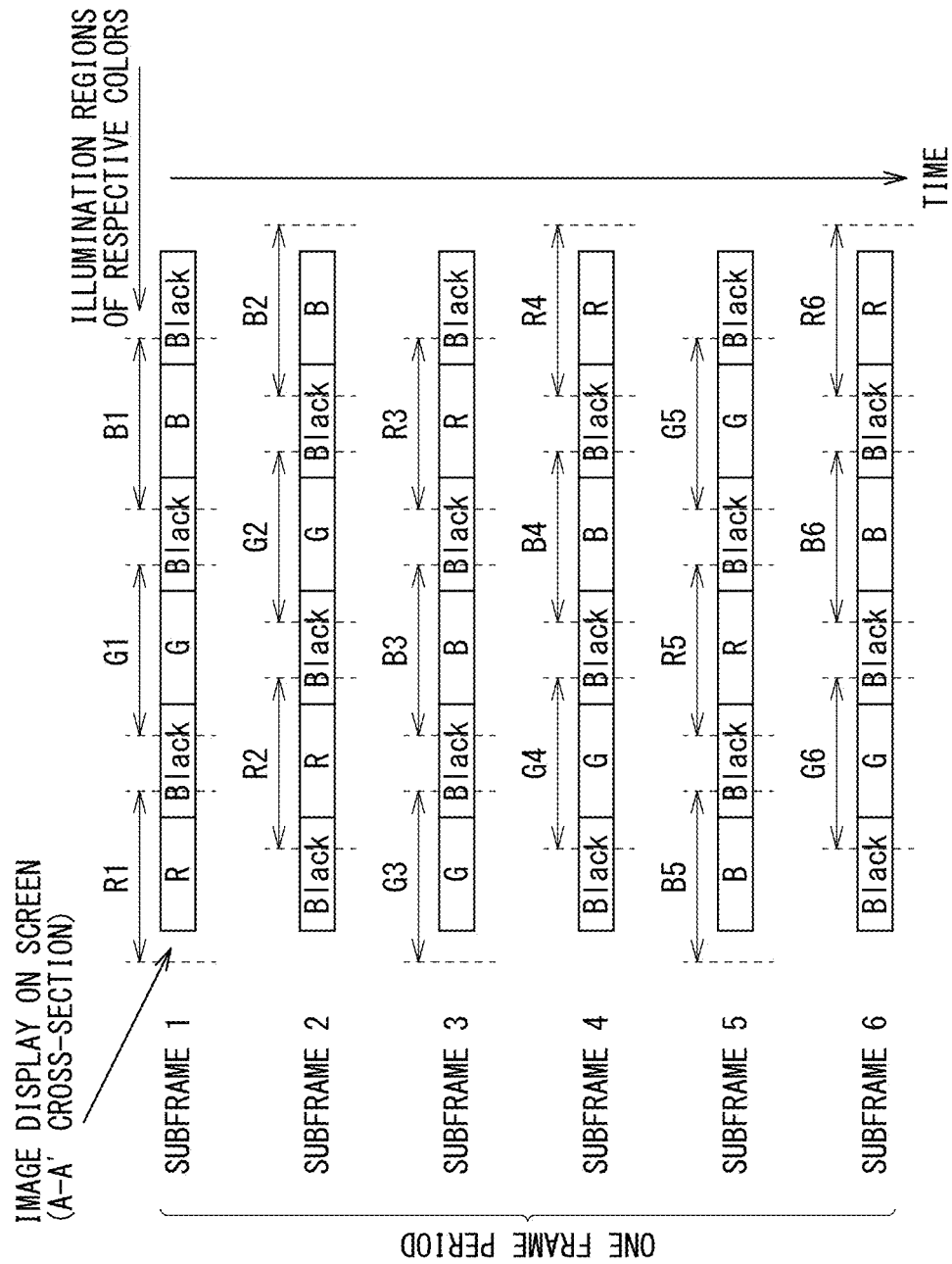
FIG. 15 is an explanatory diagram schematically illustrating a second specific switching example of image display and illumination regions in a plurality of pixel regions on the light intensity modulation element in the display apparatus according to the fourth embodiment.

FIG. 14 schematically illustrates a first specific switching example of image display and illumination regions in the plurality of pixel regions 110 on the light intensity modulation element 3 in the display apparatus according to the fourth embodiment. FIG. 15 schematically illustrates a second specific switching example of image display and illumination regions in the plurality of pixel regions 110 on the light intensity modulation element 3 in the display apparatus according to the fourth embodiment.

FIG. 14 and FIG. 15 each illustrate a switching example of image display and illumination regions in a cross-section along a line part A-A' in FIG. 13. FIGS. 14 and 15 each illustrate a switching example in a case where one frame period is divided into six subframes 1 to 6. In FIGS. 14 and 15, for example, Rx (x=1 to 6) corresponds to the red illumination region 120R in a subframe x.

FIG. 14 illustrates an example in which pixel regions that perform black display are switched between a first half subframe period (subframes 1 to 3) and a second half subframe period (subframes 4 to 6). FIG. 15 illustrates a switching example of pixel regions that perform black display for each subframe period.

It is to be noted that the switching of the image display and the illumination regions is not limited to the examples illustrated in FIGS. 14 and 15, and other switching methods may be employed.

Other configurations, operations, and effects may be substantially similar to those of the display apparatus according to any of the foregoing first to third embodiments.

5. Fifth Embodiment

Next, description is given of a display apparatus according to a fifth embodiment of the present disclosure. It is to be noted that, in the following, components substantially the same as those of the display apparatus according to any of the foregoing first to fourth embodiments are denoted by the same reference numerals, and the descriptions thereof are omitted where appropriate.

In the following, description is given on the basis of the configuration example (FIG. 1) using the diffraction optical element 1 as the diffraction element.

Figure 16:
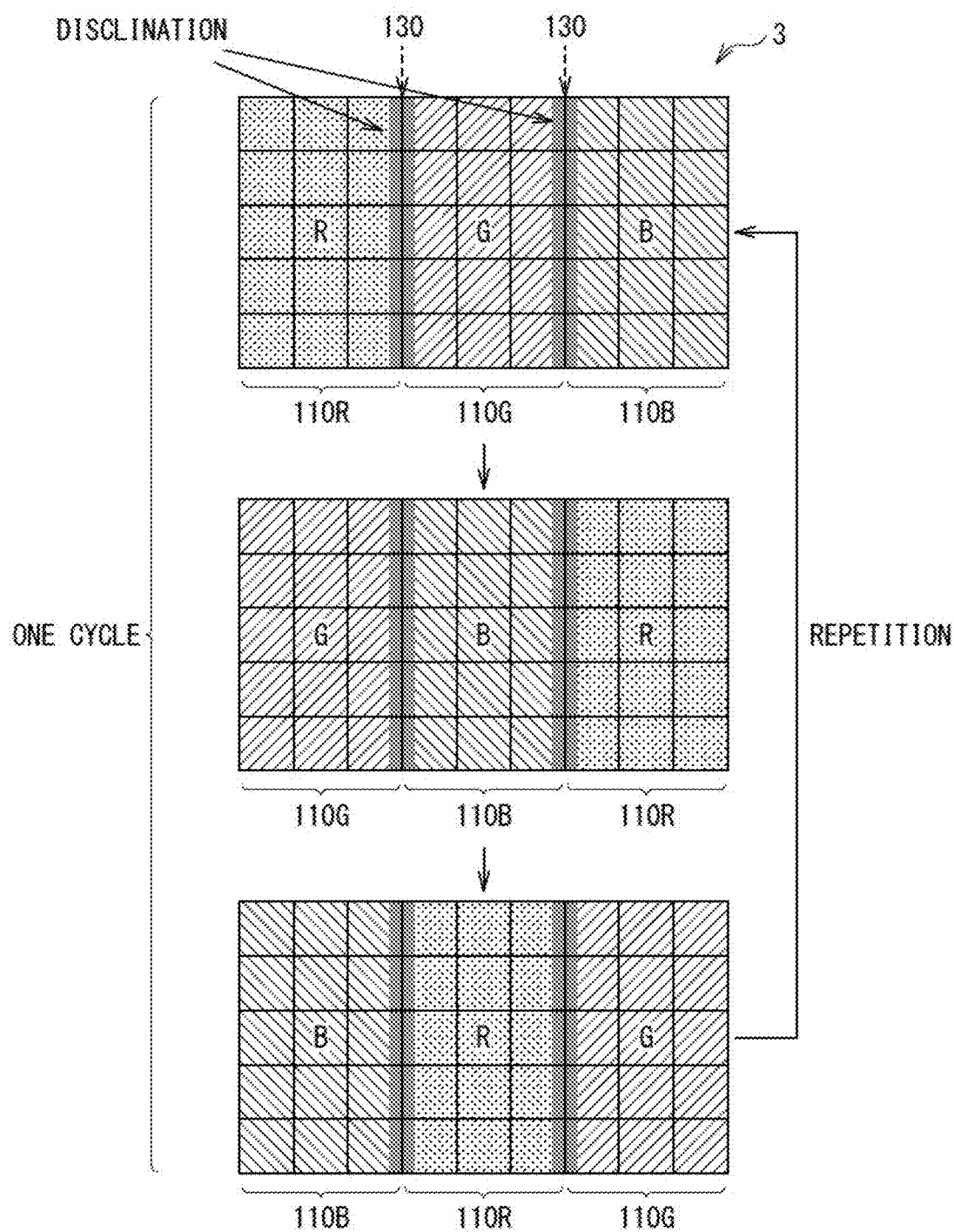
FIG. 16 is an explanatory diagram schematically illustrating an example of display states of an image on a light intensity modulation element in a display apparatus of a comparative example in contrast to a display apparatus according to a fifth embodiment.
Figure 17:
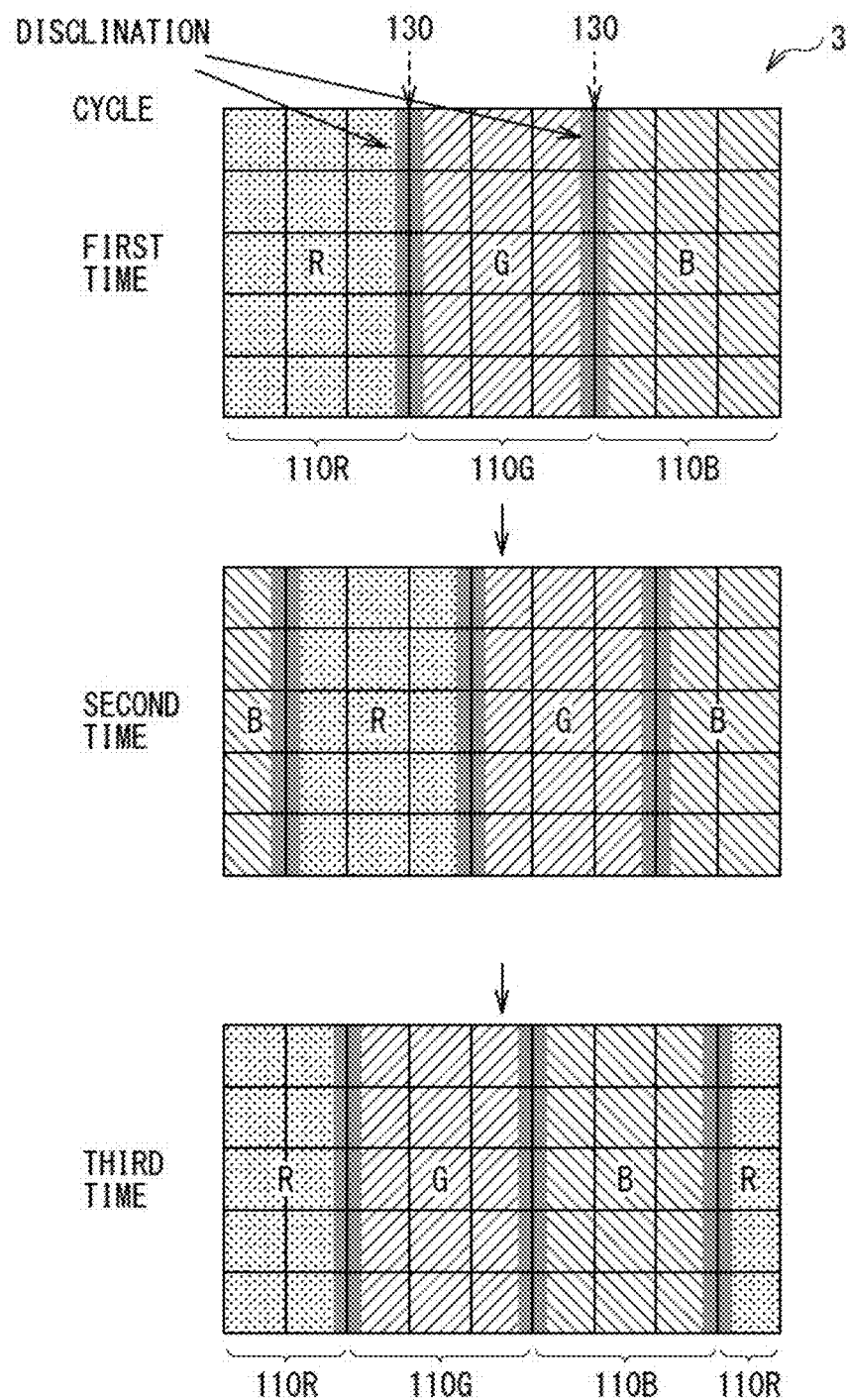
FIG. 17 is an explanatory diagram schematically illustrating an example of display states of an image on a light intensity modulation element in the display apparatus according to the fifth embodiment.

FIG. 16 schematically illustrates an example of display states of an image on the light intensity modulation element 3 in the display apparatus of the comparative example, in contrast to the display apparatus according to the fifth embodiment. FIG. 17 schematically illustrates an example of display states of an image on the light intensity modulation element 3 in the display apparatus according to the fifth embodiment.

In a case where the light intensity modulation element 3 is a liquid crystal display element, a constantly fixed boundary of the image display results in different voltages to be applied to pixels due to difference in the display color when performing raster display, or the like. This causes generation of a transverse electric field among pixels in the liquid crystal display element, thus generating an abnormal alignment part called disclination. A deviation occurs from desired brightness in the abnormal alignment part, thus causing generation of a dark part on a boundary line.

FIGS. 16 and 17 each illustrate an example of including, as the plurality of pixel regions 110, a red pixel region 110R, a green pixel region 110G, and a blue pixel region 110B, with colors of the respective pixel regions being sequentially switched.

FIG. 16 illustrates display states of the pixel regions in respective subframe periods within one frame period, for example. As illustrated in FIG. 16, when a boundary position 130 between neighboring pixel regions is constantly fixed, disclination is generated at an identical pixel position, thus causing generation of a dark part at the identical pixel position. Accordingly, the boundary position 130 between the neighboring pixel regions ends up being easily visually recognized.

Meanwhile, FIG. 17 illustrates, for example, display of the first subframe periods of one frame period for three frames. In the display apparatus according to the fifth embodiment, the control unit 4 changes the boundary position 130 between the neighboring pixel regions in the plurality of pixel regions 110, with respect to the light intensity modulation element 3. The control unit 4 changes the boundary position 130 between the neighboring pixel regions, for example, for each predetermined period (e.g., one frame period). In this manner, switching among the red pixel region 110R, the green pixel region 110G, and the blue pixel region 110B is set as one cycle, and the boundary position 130 between the neighboring pixel regions is shifted in each cycle, thereby causing the position of the disclination to be spatially dispersed, thus making it possible to make the dark part less likely to be recognized.

It is to be noted that, in FIG. 17, the pixel regions are displayed to be in a vertical stripe form; however, setting of the boundary position 130 between the neighboring pixel regions and arrangement of the pixel regions in each cycle are not limited thereto.

Other configurations, operations, and effects may be substantially similar to those of the display apparatus according to any of the foregoing first to fourth embodiments.

6. Sixth Embodiment

Next, description is given of a display apparatus according to a sixth embodiment of the present disclosure. It is to be noted that, in the following, components substantially the same as those of the display apparatus according to any of the foregoing first to fifth embodiments are denoted by the same reference numerals, and the descriptions thereof are omitted where appropriate.

In the following, description is given on the basis of the configuration example (FIG. 1) using the diffraction optical element 1 as the diffraction element.

In the display apparatus according to the sixth embodiment, the light intensity modulation element 3 performs image display by a dot-sequential scanning system or a line-sequential scanning system. In a case where writing of image data of the light intensity modulation element 3 is performed by the dot-sequential scanning system or the line-sequential scanning system, the control unit 4 preferably switches the illumination regions sequentially by following the scanning of the pixels in the light intensity modulation element 3. This enables selection of illumination regions optimum for the image data, thus making it possible to improve light utilization efficiency and image quality.

Figure 18:
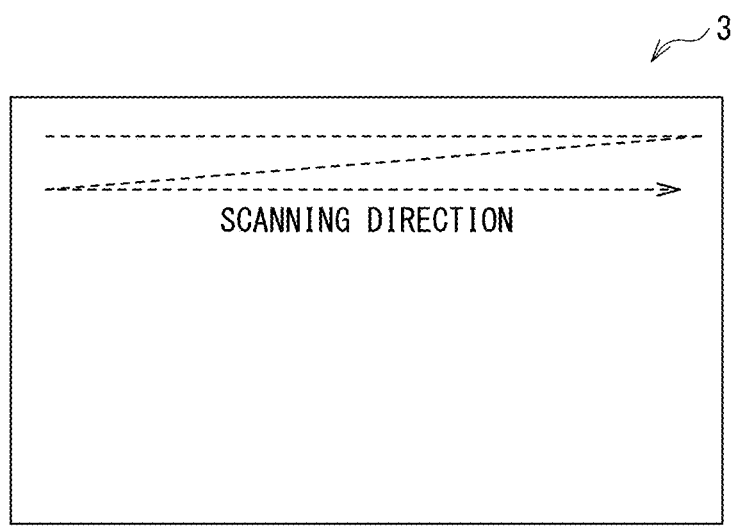
FIG. 18 is an explanatory diagram schematically illustrating an example of a scanning direction of image data in a light intensity modulation element of a display apparatus according to a sixth embodiment.
Figure 19:
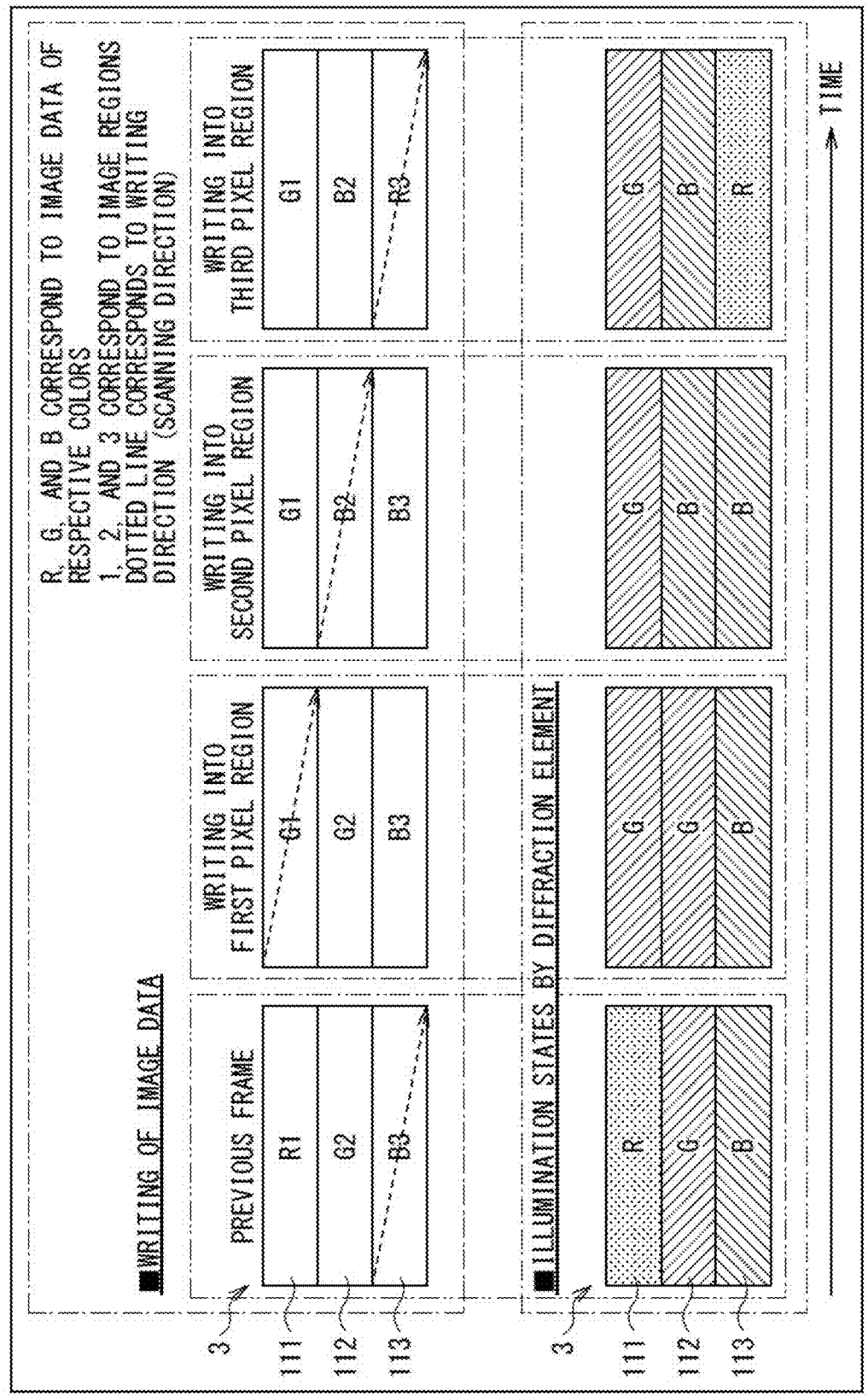
FIG. 19 is an explanatory diagram schematically illustrating an example of writing states of image data and illumination states by a diffraction optical element in the light intensity modulation element of the display apparatus according to the sixth embodiment.

FIG. 18 schematically illustrates an example of a scanning direction of image data in the light intensity modulation element 3 of the display apparatus according to the sixth embodiment. FIG. 19 schematically illustrates an example of writing states of image data in the light intensity modulation element 3 and illumination states by the diffraction optical element 1, in accordance with the scanning direction of FIG. 18.

an example of the display apparatus according to the sixth embodiment.

FIG. 19 illustrates, in the upper part, an example of writing states of the image data in each of a first pixel region 111, a second pixel region 112, and a third pixel region 113 on the light intensity modulation element 3. FIG. 19 illustrates, in the lower part, an example of illumination states by the diffraction optical element 1 for each of the first pixel region 111, the second pixel region 112, and the third pixel region 113 on the light intensity modulation element 3. In FIG. 19, R, G, and B correspond to image data of the respective colors. R1, R2, R3, and the like correspond to respective pixel regions. In the upper part of FIG. 19, a dotted line corresponds to a writing direction (scanning direction).

For example, as illustrated in FIG. 19, in a case where green image data is written into the first pixel region 111 from the previous frame in order by dot-sequential scanning or line-sequential scanning from the upper left, the control unit 4 switches illumination states by the diffraction optical element 1 to allow illumination of illumination regions and illumination colors to be performed in a manner corresponding to the image data of the first pixel region 111. The control unit 4 similarly switches illumination states by the diffraction optical element 1 also for the second pixel region 112 and the third pixel region 113. In the example of FIG. 19, the scanning of the image data is switched sequentially in the order of the first pixel region 111, the second pixel region 112, and the third pixel region 113, thereby allowing for complete switching of image data and illumination states of all the pixel regions.

Figure 20:
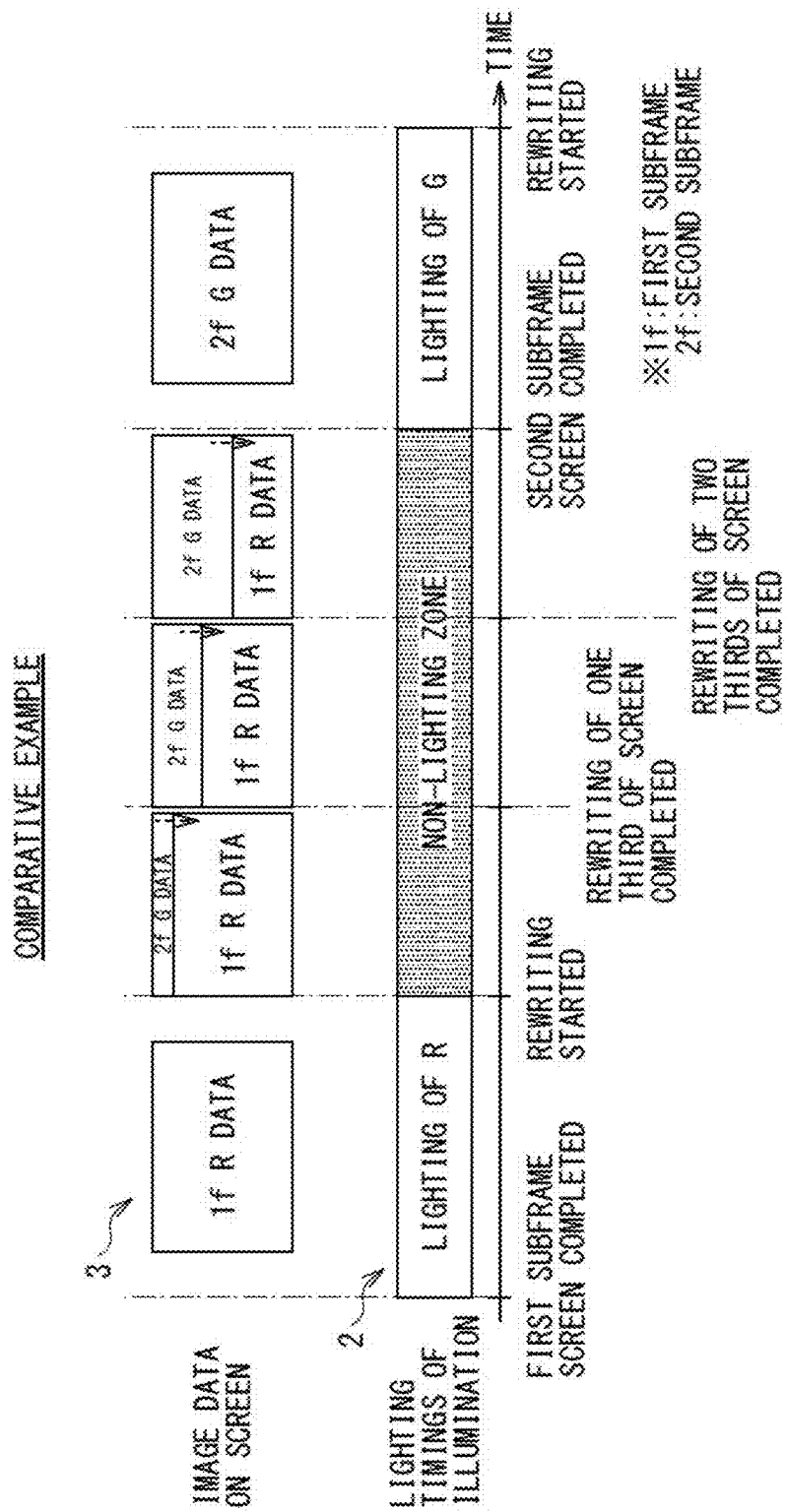
FIG. 20 is a timing chart schematically illustrating an example of a relationship between display states of an image on the light intensity modulation element and lighting states of an illumination by a light source unit in the display apparatus of the comparative example in contrast to the display apparatus according to the sixth embodiment.
Figure 21:
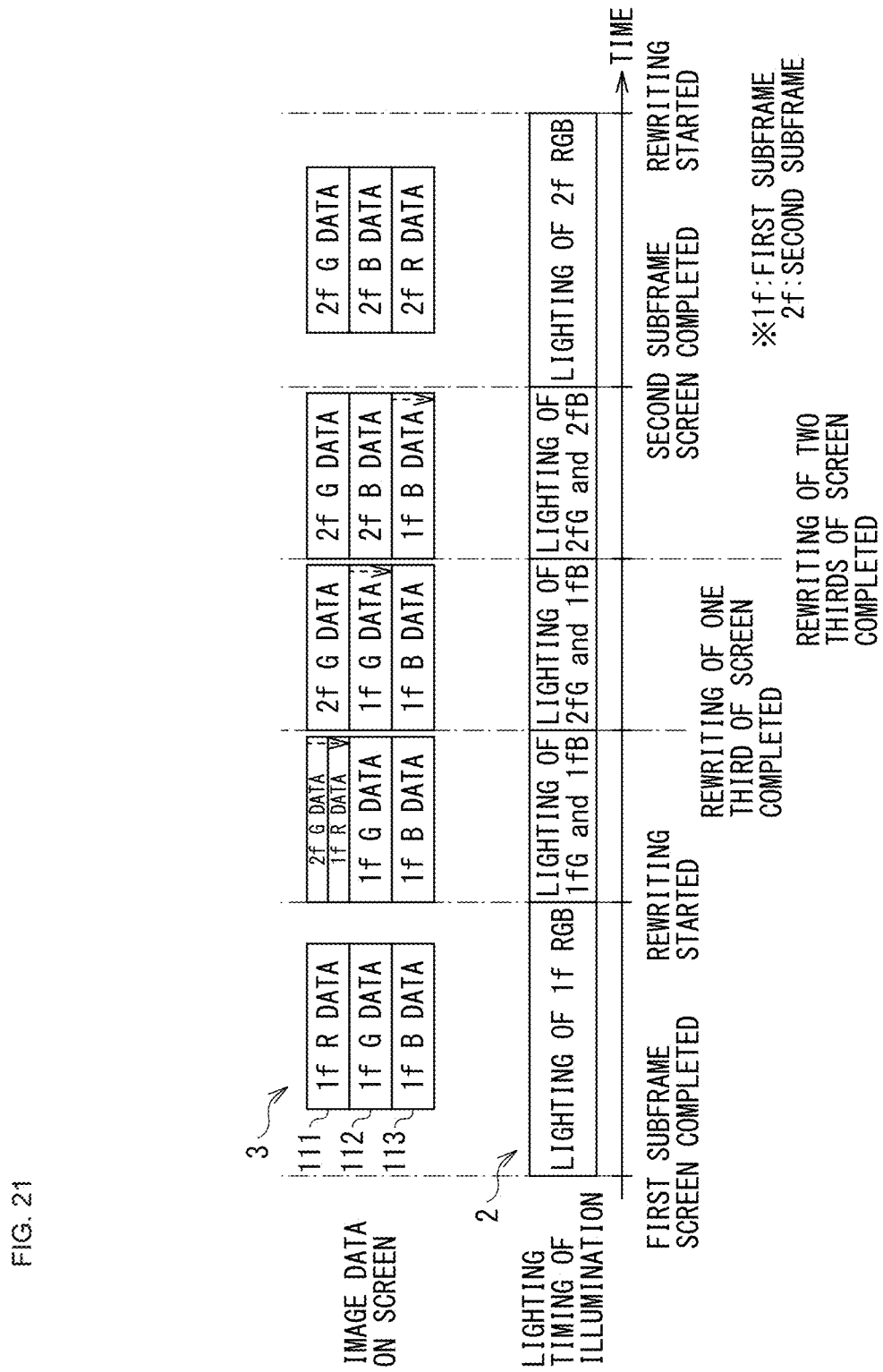
FIG. 21 is a timing chart schematically illustrating an example of a relationship between display states of an image on the light intensity modulation element and lighting states of an illumination by a light source unit in the display apparatus according to the sixth embodiment.

FIG. 20 is a timing chart schematically illustrating an example of a relationship between display states of an image on the light intensity modulation element 3 and lighting states of an illumination by the light source unit 2 in the display apparatus of the comparative example, in contrast to the display apparatus according to the sixth embodiment. FIG. 21 is a timing chart schematically illustrating an example of a relationship between display states of an image on the light intensity modulation element 3 and lighting states of an illumination by the light source unit 2 in the display apparatus according to the sixth embodiment.

In FIGS. 20 and 21, 1f denotes a first subframe timing, and 2f denotes a second subframe timing. FIGS. 20 and 21 each illustrate, in the upper part, an example of image data on a screen on the light intensity modulation element 3. FIGS. 20 and 21 each illustrate, in the lower part, an example of lighting timings of the respective color light beams by the light source unit 2.

FIG. 20 illustrates, as a comparative example, a timing chart in the display apparatus according to a typical field sequential system. FIG. 20 illustrates an example of switching the entire image data on the screen from red to green. At a timing when the entire image data on the screen is completely switched from red to green, the lighting state switches to an illumination (lighting) by the green light Lg from the red light Lr. In this case, there is a time lag until the entire image data on the screen is completely switched from red image data (1fR data) to green image data (2fG data), and thus a non-lighting zone is present in the middle of switching the image data.

Meanwhile, FIG. 21 illustrates an example of switching colors of image data to be displayed on each of the first pixel region 111, the second pixel region 112, and the third pixel region 113 on the light intensity modulation element 3, from the order of R, G and B to the order of G, B and R. In FIG. 21, lighting of at least one color is constantly performed by following the scanning, and thus a non-lighting zone is not present, as compared with the comparative example of FIG. 20. This makes it possible to improve brightness.

Other configurations, operations, and effects may be substantially similar to those of the display apparatus according to any of the foregoing first to fifth embodiments.

7. Other Embodiments

The technique according to the present disclosure is not limited to the descriptions of the foregoing embodiments, and may be modified in a wide variety of ways.

For example, the present technology may also have the following configurations.

According to the present technology having the following configuration, it is possible to improve light utilization efficiency and image quality without complicating the configuration.

(1)
A display apparatus including:
a light source unit that emits a plurality of color light beams having wavelengths different from one another;
a light intensity modulation element including a plurality of pixels, and subjecting the plurality of color light beams to intensity modulation to generate an image;
a diffraction element configured to simultaneously illuminate at least two pixel regions at pixel positions different from each other, with color light beams different from each other, by diffracting the respective color light beams from the light source unit toward a plurality of pixel regions at pixel positions different from one another on the light intensity modulation element; and
a control unit that changes diffraction angles of the respective color light beams in the diffraction element within a predetermined period, and sequentially switches illumination regions for the plurality of pixel regions by the respective color light beams, to allow all of the plurality of color light beams to time-divisionally illuminate any pixel region of the plurality of pixel regions within the predetermined period.

(2)
The display apparatus according to (1), in which the respective color light beams from the light source unit are incident on the diffraction element at certain incident angles.

(3)
The display apparatus according to (1) or (2), in which the diffraction element includes a diffraction optical element including a plurality of diffraction regions of the diffraction angles which are different, for each of the plurality of color light beams, and
the control unit sequentially switches the illumination regions for the plurality of pixel regions by the respective color light beams by moving the diffraction element to allow the respective color light beams from the light source unit to be sequentially incident on the plurality of diffraction regions time-divisionally within the predetermined period.

(4)
The display apparatus according to (3), further including a drive mechanism that drives the diffraction element under control of the control unit.

(5)
The display apparatus according to (1) or (2), in which
the diffraction element includes an optical phase modulation element that includes diffraction regions for the respective color light beams, on which the respective color light beams from the light source unit are incident, and modulates phases of the respective color light beams by displaying phase distribution patterns for the respective color light beams on the diffraction regions for the respective color light beams, and
the control unit sequentially switches the illumination regions for the plurality of pixel regions by the respective color light beams by sequentially changing the phase distribution patterns for the respective color light beams to be displayed on the optical phase modulation element, time-divisionally within the predetermined period.

(6)
The display apparatus according to (5), in which
the control unit includes a phase distribution pattern calculation circuit that calculates the phase distribution patterns, and
the phase distribution pattern calculation circuit calculates, on a basis of luminance information included in an image signal, the phase distribution patterns configured to form an illumination image having illuminance distribution corresponding to an image to be displayed by the light intensity modulation element, for the respective color light beams.

(7)
The display apparatus according to any one of (1) to (6), in which the control unit causes the light intensity modulation element to perform image display corresponding to the respective color light beams on pixel regions, of the plurality of pixel regions, smaller than the illumination regions of the respective color light beams, and to perform black display on other pixel regions.

(8)
The display apparatus according to (7), in which the control unit switches the pixel regions, on which the black display is performed, at least once within the predetermined period.

(9)
The display apparatus according to any one of (1) to (8), in which
the light intensity modulation element includes a liquid crystal display element, and
the control unit changes a boundary position between neighboring pixel regions in the plurality of pixel regions, with respect to the light intensity modulation element.

(10)
The display apparatus according to (9), in which the control unit changes the boundary position between the neighboring pixel regions for each predetermined period.

(11)
The display apparatus according to any one of (1) to (10), in which the light intensity modulation element performs image display by a dot-sequential scanning system or a line-sequential scanning system, and the control unit sequentially switches the illumination regions by following the scanning of the pixels in the light intensity modulation element.

This application claims the benefit of Japanese Priority Patent Application JP2019-010059 filed with the Japan Patent Office on Jan. 24, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display apparatus, comprising:
a light source unit that emits a plurality of color light beams having wavelengths different from one another;
a light intensity modulation element including a plurality of pixels, and subjecting the plurality of color light beams to intensity modulation to generate an image;
a diffraction element configured to simultaneously illuminate at least two pixel regions at pixel positions different from each other, with color light beams different from each other, by diffracting respective color light beams from the light source unit toward a plurality of pixel regions at pixel positions different from one another on the light intensity modulation element; and
a control unit that changes diffraction angles of the respective color light beams in the diffraction element within a predetermined period, and sequentially switches illumination regions for the plurality of pixel regions by the respective color light beams, to allow all of the plurality of color light beams to time-divisionally illuminate any pixel region of the plurality of pixel regions within the predetermined period,
wherein the diffraction element comprises a diffraction optical element including a plurality of diffraction regions of the diffraction angles which are different, for each of the plurality of color light beams and
wherein the plurality of diffraction regions are arranged in a rectangular configuration with two rows of the plurality of diffraction regions in series with each other and the diffraction element has a configuration in which a rectangular operation enables sequentially switching among the plurality of diffraction regions according to a rectangular operation direction.

2. The display apparatus according to claim 1, wherein the respective color light beams from the light source unit are incident on the diffraction element at certain incident angles.

3. The display apparatus according to claim 1, wherein the control unit sequentially switches the illumination regions for the plurality of pixel regions by the respective color light beams by moving the diffraction element to allow the respective color light beams from the light source unit to be sequentially incident on the plurality of diffraction regions time-divisionally within the predetermined period.

4. The display apparatus according to claim 3, further comprising a drive mechanism that drives the diffraction element under control of the control unit.

5. The display apparatus according to claim 1, wherein
the diffraction element comprises an optical phase modulation element that includes diffraction regions for the respective color light beams, on which the respective color light beams from the light source unit are incident, and modulates phases of the respective color light beams by displaying phase distribution patterns for the respective color light beams on the diffraction regions for the respective color light beams, and
the control unit sequentially switches the illumination regions for the plurality of pixel regions by the respective color light beams by sequentially changing the phase distribution patterns for the respective color light beams to be displayed on the optical phase modulation element, time-divisionally within the predetermined period.

* * * * *